Feb. 23, 1960 L. E. FOGARTY 2,925,667
AIRCRAFT TRAINER APPARATUS
Filed Dec. 27, 1954 6 Sheets-Sheet 2

LAURENCE E. FOGARTY
INVENTOR

BY
ATTORNEY

Feb. 23, 1960 L. E. FOGARTY 2,925,667
AIRCRAFT TRAINER APPARATUS
Filed Dec. 27, 1954 6 Sheets-Sheet 3

LAURENCE E. FOGARTY
INVENTOR

BY Richard D. Stephens
ATTORNEY

Feb. 23, 1960 L. E. FOGARTY 2,925,667
AIRCRAFT TRAINER APPARATUS
Filed Dec. 27, 1954 6 Sheets-Sheet 4

LAURENCE E. FOGARTY
INVENTOR
BY Richard G. Stephens
ATTORNEY

LAURENCE E. FOGARTY
INVENTOR

Feb. 23, 1960  L. E. FOGARTY  2,925,667
AIRCRAFT TRAINER APPARATUS
Filed Dec. 27, 1954  6 Sheets-Sheet 6

LAURENCE E. FOGARTY
INVENTOR

BY Richard G. Stephens
ATTORNEY

United States Patent Office 2,925,667
Patented Feb. 23, 1960

2,925,667

AIRCRAFT TRAINER APPARATUS

Laurence E. Fogarty, Binghamton, N.Y., assignor to Link Aviation, Inc., Binghamton, N.Y., a corporation of New York Application December 27, 1954, Serial No. 477,741

38 Claims. (Cl. 35—12)

This invention relates to grounded aircraft training apparatus in which the operation of controls similar to those of an actual aircraft cause indications observable by a student operator, whereby such student operator may be given ground training to insure efficient aircraft operation under actual flying conditions in an actual aircraft. Since modern day aircraft are costly to build, to fly, and to maintain, and the use of such aircraft for extended training periods of personnel unacquainted with the type aircraft is both costly and hazardous, the use of grounded trainers to give extensive preliminary training has become common. As will be apparent, the value of such preliminary training in grounded aircraft trainers depends largely upon the degree of realism to which the student is subjected while he "flies" the grounded aircraft trainer.

In prior art trainers some of the effects of wind have been simulated. Most commonly, simulated aircraft velocity has been resolved into components, and to these aircraft velocity components have been added components of wind velocity to obtain suitable potentials for positioning the pen of a recorder, which traces the path of simulated flight on a standard aeronautical map. In order that simulated wind not actuate the recorder pen while the simulated aircraft is parked on the ground, prior art systems have disconnected or disabled "wind potentials" when the simulated aircraft have been grounded, and have connected such wind potentials only when the aircraft has become airborne. Such systems have therefore completely ignored the effect of wind on takeoff or landing. For example, when an actual aircraft is parked on the ground, a high wind may cause an indication on the aircraft indicated airspeed meter. Such indications are completely absent from prior art trainers. Furthermore, it is well known that aircraft pilots prefer to take off and land "into the wind" to avail themselves of the added lift. Prior art systems have completely ignored wind during takeoff and landing. The fixed location of runways on an airfield requires that many takeoffs and landings be made at an angle to the direction of wind, and in making such a "cross-wind" landing, complex maneuvers are required in order that the pilot may align the aircraft with the runway while still maintaining a "crab angle" during flight. In prior art systems the absence of simulation of wind when the simulated aircraft is grounded has prevented any of the effects of wind upon takeoff and landings to be simulated.

Prior art systems have generally computed the movement of a simulated aircraft with respect to an air mass, and have introduced the effect of wind only into the flight path position as shown by the aforementioned flight path recorder. Since such recorder is usually visible only by the instructor and not by the student-pilot, the effect of wind on flight has been demonstrated to the student only by his map position, and then only in that his map position influences the character of the simulated radio signals audible to and observable by the student. The effect of wind on the aerodynamic characteristics of flight has been neglected. Furthermore, in prior art systems utilized in conjunction with visual displays of a ground scene, the simulation of wind has generally been neglected. In order that a realistic visual display of a ground scene be provided for observation by a student during both grounded movement and actual flight, it is necessary that the projector or other means utilized to produce the scene be actuated by potentials representative of the relative velocities between the simulated aircraft and the ground before, during and after takeoff and touchdown. The utilization of visual displays with prior art trainers in which wind potentials have been disabled prior to takeoff or after touchdown results in such unrealistic phenomena as a sudden great increase or decrease in speed relative to the ground as the wheels touch or leave ground. Other unrealistic simulation also occurs, some of which will be further mentioned below.

It is therefore a primary object of the invention to provide grounded flight training apparatus in which simulated wind realistically affects the aerodynamic operation of the simulated aircraft.

It is another object of the invention to provide improved grounded flight training apparatus in which aircraft operation is realistically simulated before, during, and after simulated takeoffs and landings.

It is a further object of this invention to provide grounded flight training apparatus which provides correct operating potentials for actuating visual display apparatus during "on ground" and "in flight" conditions of a simulated aircraft.

It is an additional object of the invention to provide grounded flight training apparatus which provides correct operating potentials for actuating the cockpit of a grounded trainer to produce proprioceptive effects upon a student pilot realistically simulating those produced in an actual aircraft during "on ground" and "in flight" conditions.

It is another object of the invention to provide grounded flight training apparatus in which the effects of wind during takeoff and landing are simulated whereby practice and training of cross-wind takeoffs and landings may be achieved.

It is a further object of the invention to provide grounded training apparatus in which forces and moments due to dynamic pressure on the simulated aircraft are accurately simulated by including the effect of simulated wind on dynamic pressure.

It is an additional object of the invention to provide grounded training apparatus in which the effects of simulated wind on angle of attack and sideslip angle are realistically simulated.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

Fig. 4 shows in electrical schematic form the dynamic pressure computer portion of the invention together with associated apparatus;

Figure 1:
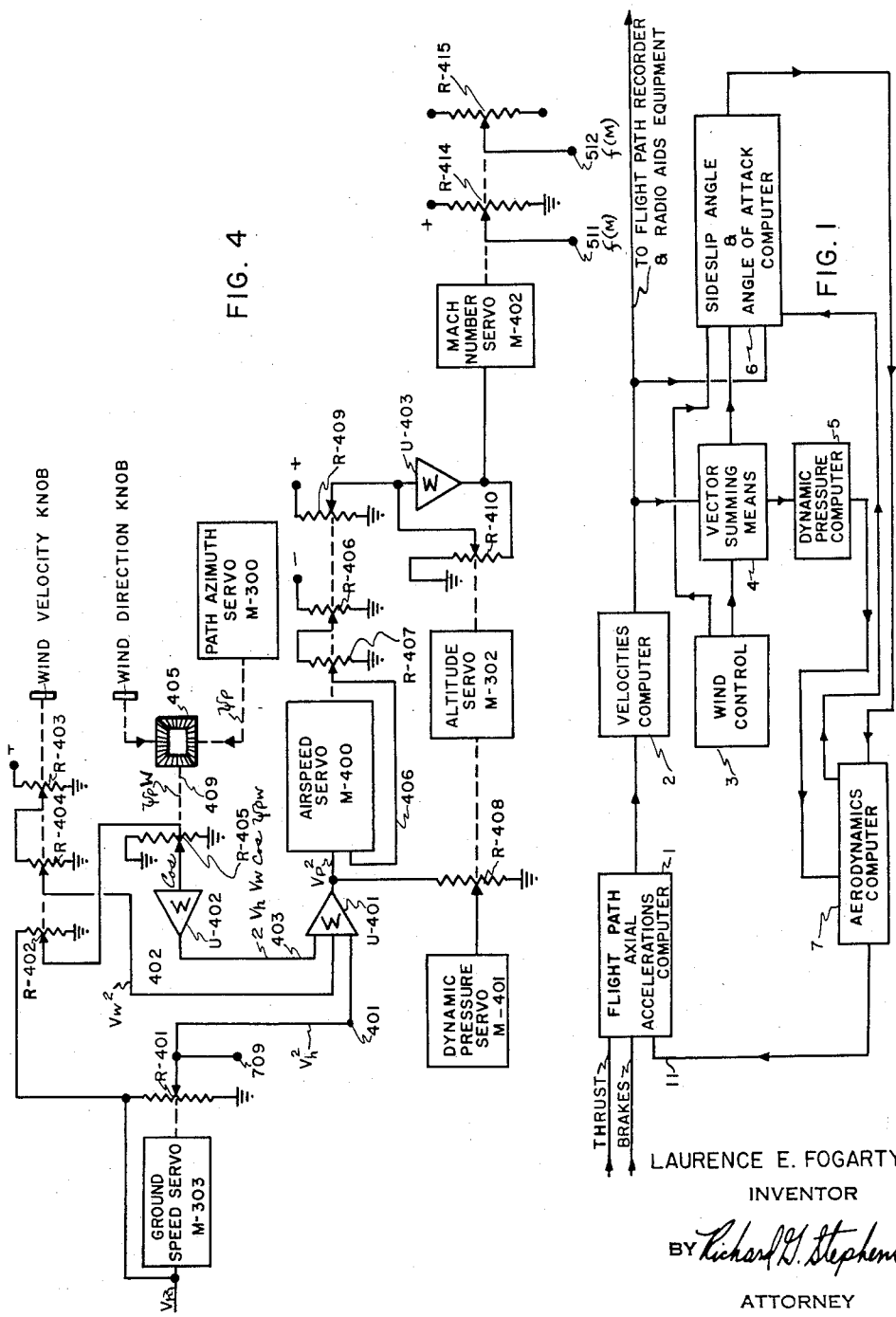
Fig. 1 shows in block form a schematic diagram of portions of the flight computing system of my invention useful in understanding the operation of the invention.

In the drawings certain well-known apparatus is shown in block form for sake of clarity. Like numerals refer to like parts throughout the drawings. The exemplary embodiment of the invention shows schematically a somewhat more rigorous and complete flight computing system than may be deemed desirable for rather realistically simulating the flight of some aircraft. Those skilled in the art will recognize that some of the potentials derived may be of negligible effect in simulating limited flight conditions and accordingly may be omitted in some embodiments without serious error. A direct current computing system has been shown schematically, and those skilled in the art will recognize that alternating current computing apparatus may be substituted in some or all parts of the invention by the use of conventional analogue computer techniques. The feedback summing amplifiers utilized may be of the type shown in U.S. Patent 2,401,779, granted June 11, 1946, to Karl D. Swartzel, amplifiers of this type being well known and widely used throughout the flight simulator, analogue computer, automatic control and instrumentation arts. For sake of clarity, and because the techniques of parallel and series addition of potentials with such amplifiers is well known, the summing resistors in the input circuits of such amplifiers have not been shown. Buffer amplifiers and isolation circuits have been omitted from many places where they would ordinarily be used in practicing the invention in order not to obscure the novel features of the invention by a showing of details in themselves well known. Each of the summing amplifiers has high loop gain, and overall gain of unity, and provides polarity reversal. The aerodynamic equations utilized are given signs in accordance with standard aeronautical practice, and hence certain amplifiers utilized solely for polarity inversion have been omitted for sake of clarity. Unless otherwise mentioned all voltages and potentials mentioned are taken with respect to ground. The computer apparatus is supplied with positive and negative voltages from a conventional power supply not shown. In direct current embodiments of the invention chopper-stabilized amplifiers are preferred for circuits requiring minimum drift. All of the servos shown in block form may comprise conventional direct current position servos or may comprise alternating current motor servos driven by conventional alternating current servoamplifiers, the direct current input signals being converted to alternating current signals by conventional choppers, as is well known in the art. Each servo may be provided with conventional rate damping means (a tachometer generator or capacitor feedback for example) to prevent overshoot and hunting, and the output shaft of each servo may position the arms of a plurality of potentiometers through conventional gearing. In direct current embodiments the integrators shown in block form may comprise conventional "Miller" integrators (discussed in detail in vol. 21, pp. 79-83) and vol. 20 (pp. 114-118) of the Massachusetts Institute of Technology, "Radiation Laboratory Series" (McGraw-Hill, New York 1948, 1949), or may comprise various of the direct voltage integrators shown in chapter 4 of "Electronic Analog Computers," by Korn and Korn (McGraw-Hill, New York, 1952). In alternating voltage embodiments conventional alternating current velocity servos are preferred, though it will be recognized by those skilled in the art that ball-disk integrators and other equivalents may be substituted without departing from the invention. It will be readily apparent to those skilled in the art that the integrator-position servo combinations shown may be replaced by velocity servos. For sake of clarity and simplicity of explanation only, the resolvers shown have been indicated merely as simple potentiometers having a sine or cosine function. It will be immediately apparent to those skilled in the art that resolvers capable of 360° operation are required in embodiments of the invention in which simulation of flight unlimited in attitude and direction is to be provided, and the invention contemplates use of such resolving means. Examples of such resolvers which may be utilized are shown on pages 281-282 of Korn and Korn cited above. It will be apparent that mechanical resolvers may be substituted, and in portions of the invention in which it has been desirable to provide a large number of resolvers on a single servo shaft, the invention shown in application Ser. No. 465,622, filed October 24, 1954, by Walter Knapp (whose assignee is common to that of the instant invention) for "Apparatus for Obtaining Sine and Cosine Voltage from Rotary Motion," now Patent No. 2,912,161, has been found to be particularly useful. In alternating voltage embodiments induction resolvers may be utilized.

Shown in Fig. 1 in block diagram form is a schematic diagram serving to show generally the novel computing method utilized in my invention. Operation of conventional grounded trainer controls such as throttles and brake pedals derives thrust and braking force potentials as well as other potentials later described and influences the operation of the axial accelerations computer 1, which is shown in greater detail in Fig. 2. Forces which act on an aircraft to tend to cause it to accelerate or decelerate along its path of travel may be said to include: (1) engine (jet or propeller) thrust forces, (2) aerodynamic forces caused by the relative motion of the aircraft and air particles of the aerodynamic fluid (air), and (3) ground forces, those applied to the aircraft as parts of it contact the ground. The axial accelerations computer 1 receives input potentials corresponding to forces tending to translate the simulated aircraft and operates to compute the acceleration of the simulated aircraft along a set of three mutually-perpendicular axes called the "flight path" axes (sometimes called "wind" axes). As will be apparent, the accelerations along the flight path depend in part upon aerodynamic forces exerted on the simulated aircraft, and hence potentials commensurate with such forces are supplied to the axial accelerations computer 1, as represented symbolically by conductor 11.

Figure 3:
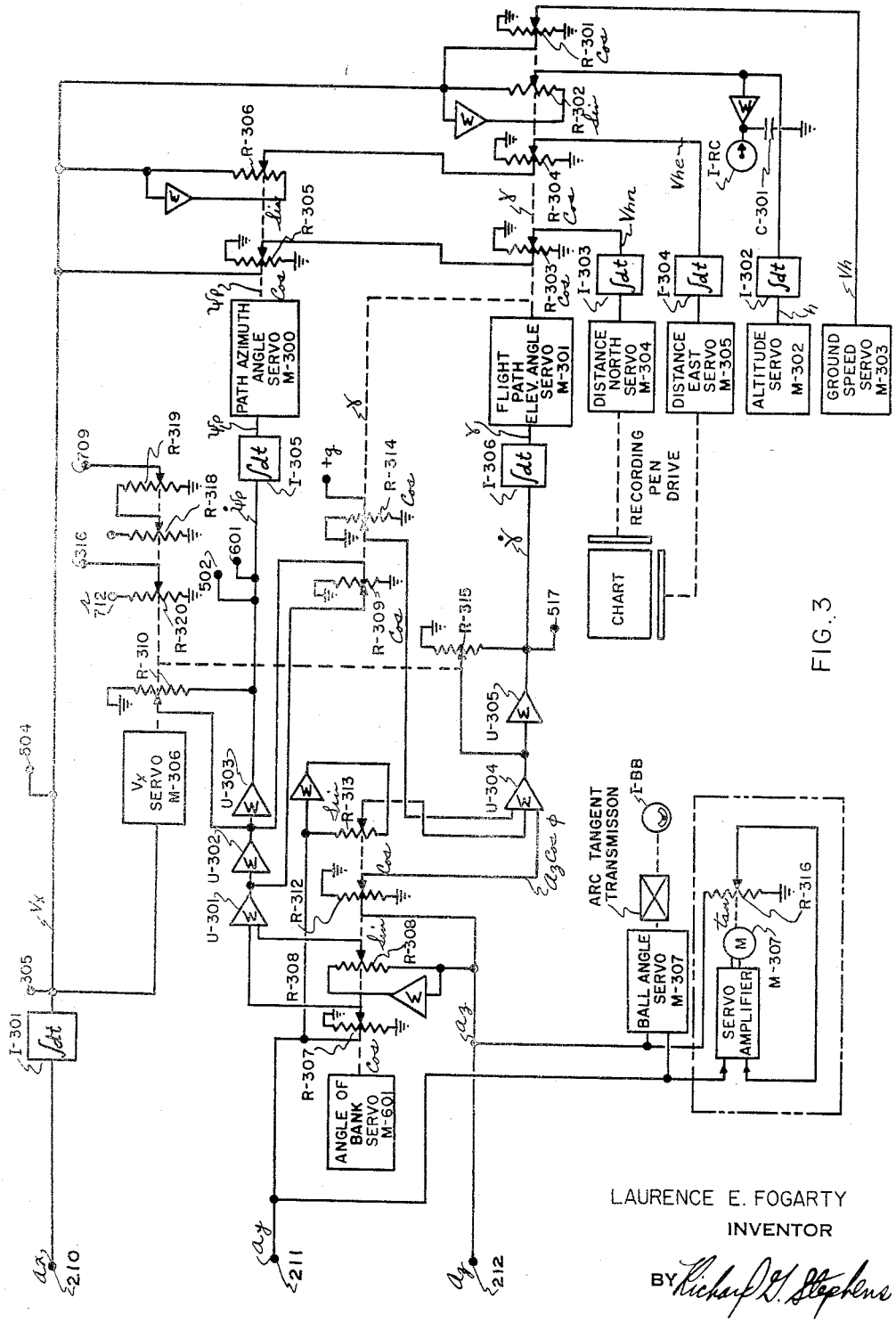
Fig. 3 shows an electrical schematic diagram of the velocities computer portion and associated apparatus of my invention, and showing how the effect of simulated wind may be introduced into the apparatus of the invention.

The axial accelerations along the flight path of the simulated aircraft are manifested by potential outputs which are supplied to computing apparatus indicated symbolically as velocities computer 2, the apparatus of which is shown in greater detail in Fig. 3. The axial acceleration potentials are integrated with respect to time to derive simulated "velocities" along the flight path axes of the simulated aircraft. The various velocities are resolved into components and combined to produce output potentials commensurate with simulated aircraft speed with respect to a point on the ground. Such output potentials are utilized in conventional fashion to operate the ground track recorder of the trainer and to operate conventional altitude responsive apparatus. The potential outputs from computer 2 will be truly commensurate with simulated aircraft speed with respect to the earth before, during, and after simulated takeoffs and landings, regardless of simulated wind conditions. Such altitude and ground speed potentials may be utilized for operating conventional grounded trainer visual display apparatus requiring such inputs without the unrealistic discontinuities present in prior art systems in which simulated wind is provided. A primary reason for such improved operation is that the effects of wind are included in the acceleration potential outputs of computer 1 and the velocity potential outputs of computer 2.

The ground speed velocity potential outputs of computer 2 are combined in vector summing means 4 with potentials commensurate with simulated wind, the latter potentials being derived in conventional grounded trainer fashion by wind control apparatus 3, which comprises wind intensity and direction controls positioned by the instructor. The ground velocity potentials and wind velocity potentials are combined to derive a dynamic pressure quantity which is a measure of the actual dynamic pressure on the simulated aircraft by apparatus indicated as dynamic pressure computer 5. Prior art systems have completely neglected the effect of wind on simulated dynamic pressure, thereby making erroneous all of the many aerodynamic forces and moments computed from the unrealistic dynamic pressure. As well as dynamic pressure, the aerodynamic forces and moments in an actual aircraft are also influenced by the effects of wind on the angle of attack and sideslip angles of the aircraft. Prior art systems have ignored such effects. In the invention the effects of wind on sideslip angle and angle of attack are simulated in novel manner by apparatus indicated symbolically as computer 6. As will be shown below in greater detail in Fig. 5, the actual sideslip angle is computed by combining sideslip angle generated by simulated wind with sideslip angle which would be generated in still air by aerodynamic forces and moments. Angle of attack is computed in a similar novel manner. Aerodynamic computer apparatus indicated symbolically as computer 7 in Fig. 1 and shown in greater detail in Fig. 6 utilizes the correctly computed dynamic pressure potential and correctly computed sideslip angle and angle of attack quantities in computing the aerodynamic forces and moments of the simulated aircraft about the body axes of the simulated aircraft. The aerodynamic forces and moments are translated from the aircraft body axis system to the simulated flight path axis system for applying the correct input force potentials via conductor 11 to computer 1, and are translated from the aircraft body axis system to a set of earth axes for deriving potentials for operating such simulated aircraft instruments as a gyro-horizon, which indicates aircraft attitude with respect to the earth axis system. As will be apparent to those skilled in the art, the choices of flight path axes for computation of simulated translational movement and airplane body axes for aerodynamic forces and moments are arbitrary, and the axis systems may be altered without departing from the invention.

The basic symbolic diagram of Fig. 1 does not attempt to show many of the circuit interconnections between the various computers, such connections being shown in detailed diagrams in Figs. 2–7. As is well known to those skilled in the art, the computer interconnections in large analogue computing apparatus such as the invention are quite extensive. Indicated symbolically and schematically in various of the figures are the simulated aircraft controls utilized commonly in modern grounded aircraft trainers. Since the precise physical arrangement of such controls depends upon the type of aircraft being simulated, and since it is believed to be quite apparent to those skilled in the art how the various simulated controls may be mechanically connected to position potentiometer arms relative to potentiometer windings no detailed showing of such mechanical arrangements is deemed necessary. Such controls comprise, for example, aileron control effected by lateral movement of a "stick" or turning of a wheel, elevator control effected by longitudinal movement of a "stick" or wheel, rudder pedal movement, brake pedal movement, etc. Other controls commonly utilized on actual aircraft may comprise motor driven apparatus such as wing flaps and landing gear controls. Since motor-driven potentiometers have been widely used in simulating the operation of such apparatus, a detailed showing and description of such controls have been omitted in the interests of clarity. Also, several well-known and widely used servomechanisms have been shown in block diagram form for sake of clarity. For example, many well-known grounded trainers utilize an "aircraft weight" servo and an aircraft "center of gravity" servo. Since such servos are well known to those skilled in the art and since the operation of such servos depends upon factors only remotely related to the computing system of the invention, a detailed description of such servos is omitted.

As mentioned above the invention is useful in providing correct operating potentials for trainers utilizing visual displays. A visual display of particular merit which may be utilized with the present invention is an embodiment of the invention shown in application Ser. No. 457,514, filed September 21, 1954, by Harold S. Hemstreet and Robert A. Woodson (whose assignee is common to that of the instant invention), for "Method and Means for Producing Visual Display in Grounded Aircraft Trainers." Ground position, altitude and heading potentials required for operation of the projector portion and attitude potentials required for operating the cockpit portion of the Hemstreet and Woodson invention are available as outputs in the instant invention before, during, and after takeoffs and landings, allowing the Hemstreet and Woodson system to be utilized to simulate complete flights, with the many effects of wind always realistically simulated.

The instant invention may also be utilized in conjunction with the apparatus shown in my copending application Ser. No. 441,570, filed July 6, 1954, for "Grounded Aviation Trainer," and in conjunction with the apparatus shown in my copending application Ser. No. 457,715, filed September 22, 1954, for "Proprioceptive Grounded Aircraft Trainer," now abandoned, and the potentials required for correctly actuating the cockpit motion apparatus of my two abovementioned copending applications will be supplied by the apparatus of the present invention for takeoff, flight and landings.

Figure 7:
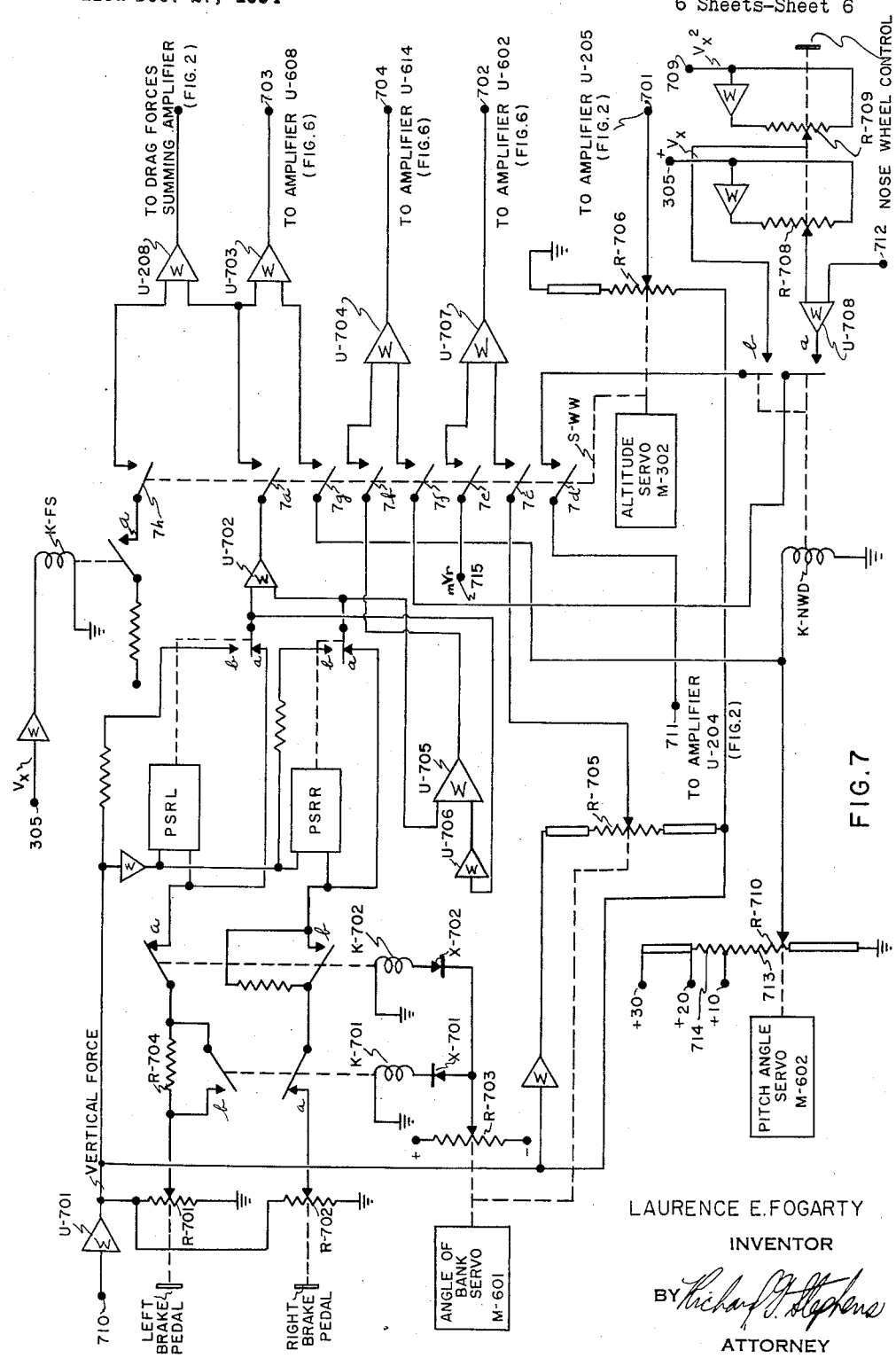
Fig. 7 is an electrical schematic diagram of the "ground forces" computer portion of my invention.

Shown in detail in Fig. 7 is a novel "landing system" or "ground forces computer" portion of my invention, which is connected to the flight system computers to provide realistic simulation of aircraft operation as the aircraft wheels touch the runway, carrier deck, or landing strip. As the simulated aircraft moves along the ground, the forces due to the wheels, aerodynamic forces and forces due to wind are all continuously computed to provide much more realistic simulation of takeoffs and landings than in prior art trainers. The system of Fig. 7 will be explained in greater detail below.

Figure 2:
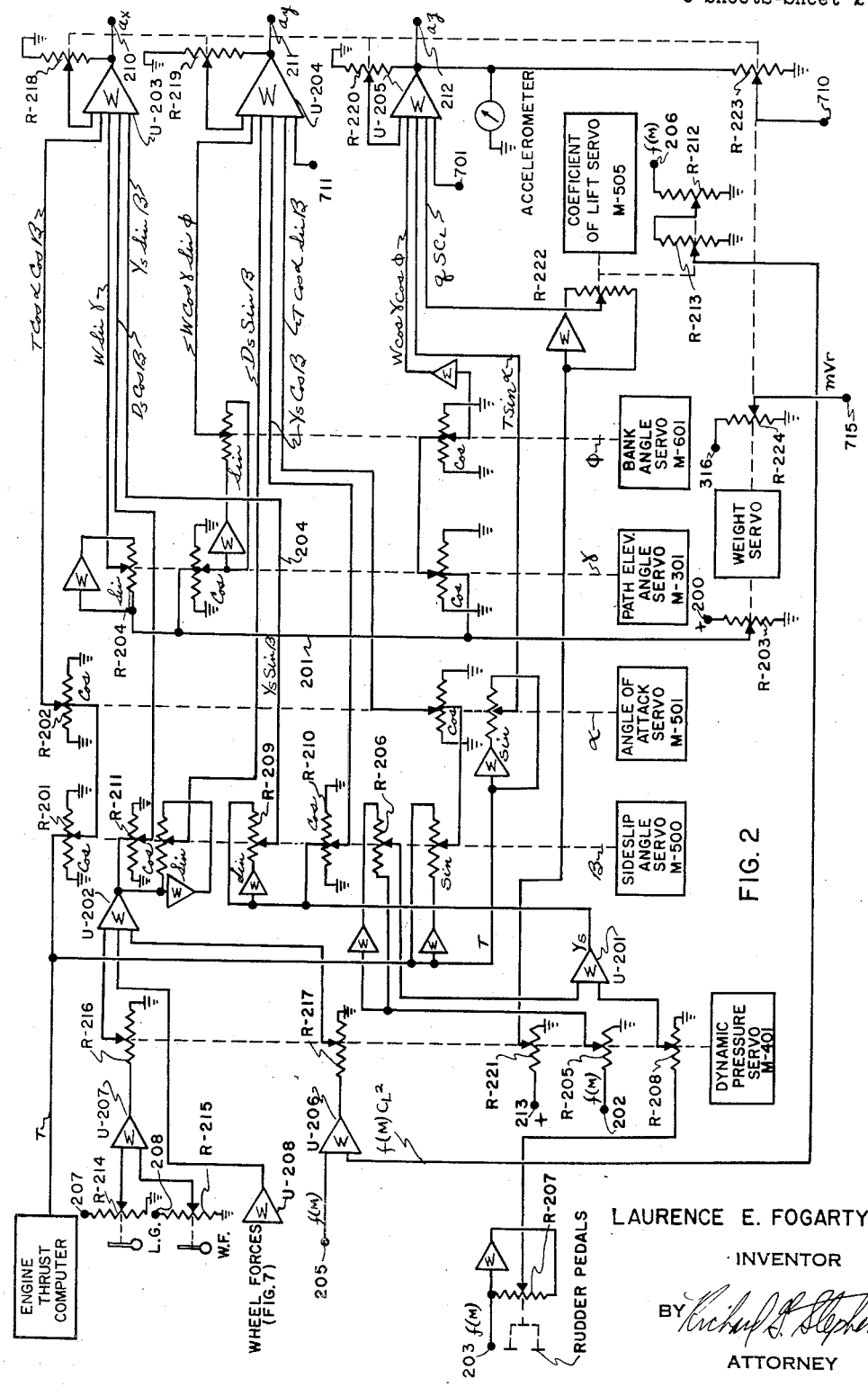
Fig. 2 is an electrical schematic diagram of the axial accelerations computer portion of the invention.

The axial accelerations computer shown schematically in Fig. 2 computes the accelerations of the simulated aircraft along three mutually perpendicular flight path axes, the longitudinal or X axis, the lateral or Y axis and the vertical or Z axis. In computing aircraft acceleration along the longitudinal axis of the flight path, voltages commensurate with forces and components acting along this axis are derived and applied to summing amplifier U–203. A potential commensurate with engine thrust T is derived by a conventional grounded trainer engine computer and applied to amplifier U–203 via cosine potentiometers R–201 and R–202. These potentiometers are positioned by the trainer sideslip angle servo M–500 and the trainer angle of attack servo M–501, so that the quantity $T \cos \alpha \cos \beta$ is applied to amplifier U–203. This potential is commensurate with the component of thrust acting along the longitudinal axis of the flight path of the simulated aircraft. A constant potential from the computer power supply is connected to terminal 200 of potentiometer R–203, the arm of which is positioned by a conventional grounded trainer weight servo in accordance with instantaneous weight W of the simulated aircraft, applying weight potentials of opposite polarity to the terminals of sine potentiometer R–204, the arm of which is positioned by the trainer flight path elevation angle servo M–301 in accordance with the instantaneous elevation angle $\gamma$ of the simulated flight path. The arm of potentiometer R-204 thusly applies a $W \sin \gamma$ potential to summing amplifier U-203.

Applied to terminals 202 and 203 are potentials which are functions of Mach number of simulated flight. These potentials are derived from potentiometers positioned by the trainer Mach number servo M-402, the operation of which is explained in connection with Fig. 4. The potential on terminal 202 is applied to excite the winding of potentiometer R-205, the arm of which is positioned by the trainer dynamic pressure servo M-401, thereby deriving a potential commensurate with $f(M)q$, the product of the function of Mach number and dynamic pressure. The $f(M)q$ potential is modified by potentiometer R-206 in accordance with simulated sideslip angle $\beta$ and applied to summing amplifier U-201. The potential on terminal 203 is applied to excite potentiometer R-207, the arm of which is positioned by movement $\delta_r$ of the simulated rudder pedals of the simulated aircraft. The $f(M)\delta_r$ potential from the arm of potentiometer R-207 is applied to excite potentiometer R-208, which is also positioned by the dynamic pressure servo M-401, to apply a $f(M)\delta_r q$ potential to summing amplifier U-201. The side force $Y_s$ on a moving aircraft is commensurate with the $f(M)q\delta_r$ and the $f(M)q\beta$ potentials applied to amplifier U-201. The components of the side force acting along the longitudinal and lateral axes of the flight path are determined by resolving the output potential from amplifier U-201 into a longitudinal component $Y_s \sin \beta$ and a lateral component $Y_s \cos \beta$ by means of potentiometers R-209 and R-210, the arms of which are positioned as indicated schematically by the trainer sideslip angle servo M-500. The component of aircraft side force acting along the aircraft flight path longitudinal axis is applied to amplifier U-203 via conductor 204. Also applied to amplifier U-203 is the component of aircraft drag acting along the longitudinal axis of the flight path. This potential $D \cos \beta$ is derived by modifying the output potential of summing amplifier U-202 in accordance with sideslip angle $\beta$ by means of cosine potentiometer R-211. Potentials commensurate with various factors affecting aircraft drag are derived and summed in amplifier U-202. Aircraft drag D may be expressed as:

$$D = qSC_D$$

where $q$ = dynamic pressure
$S$ = a representative or nominal wing area
$C_D$ = drag coefficient The drag coefficient $C_D$ is determined by a number of factors, a few typical ones being shown in the apparatus of Fig. 2. $C_D$ may be expressed as:

$$C_D = C_{D0} + C_{D_{\delta_{LG}}}\delta_{LG} + C_{D_{\delta_{WF}}}\delta_{WF} + kC_L^2$$

where $C_{D0}$ = basic aircraft drag
$C_{D_{\delta_{LG}}}$ = landing gear drag coefficient component
$C_{D_{\delta_{WF}}}$ = wing flaps drag coefficient component
$kC_L^2$ = induced drag Each of the drag coefficient components varies in accordance with Mach number of flight due to compressibility of the air. In trainers constructed to simulate low speed aircraft the drag coefficient components may be assumed to be constants, but in simulating high speed aircraft, it is desirable to vary the drag coefficient potentials in accordance with Mach number. A potential commensurate with basic drag $C_{D0}$ is applied at terminal 205 to amplifier U-206. This potential may be derived from a potentiometer positioned by the trainer Mach number servo M-402. Another $f(M)$ potential is applied at terminal 206, multiplied twice by coefficient of lift ($C_L$) by potentiometers R-212 and R-213 and then applied to amplifier U-206. These two input potentials to amplifier U-206 may be seen to be commensurate with the first and last drag coefficient components in the above expression. Potentials which are functions of Mach number may be applied to the terminals 207 and 208 of potentiometers R-214 and R-215, said $f(M)$ potentials also being derived by potentiometers (not shown) positioned by the trainer Mach number servo. These potentials are modified in accordance with simulated aircraft landing gear position and wing flaps position by potentiometers R-214 and R-215, the arms of which are positioned by the trainer landing gear control (indicated generally as L.G.) and the trainer wing flaps control (indicated generally as W.F.). The potentials, which are commensurate with the $$C_{D_{\delta_{LG}}}\delta_{LG} \text{ and } C_{D_{\delta_{WF}}}\delta_{WF}$$

terms of the above expression, are applied to summing amplifier U-207, the output of which excites potentiometer R-216. The potential output of amplifier U-207 is hence modified in accordance with simulated dynamic pressure, to apply a potential to summing amplifier U-202 commensurate with the drag force due to landing gear and wing flaps deflection. The drag coefficient components potential output from amplifier U-206 is similarly multiplied by dynamic pressure by potentiometer R-217 to apply a potential to amplifier U-202 commensurate with basic drag and induced drag. Also applied to drag forces summing amplifier U-202 is a potential from ground forces summing amplifier U-208. This potential, which is present only when the simulated aircraft is on the ground, and which represents a retarding force, is derived by circuitry shown and explained in connection with Fig. 7. Thus it will be seen that the total drag of the aircraft is represented by the potential output of amplifier U-202. As mentioned above, the effects of drag on acceleration along the longitudinal and lateral axes of the flight path are simulated by resolving the drag force potential into components and applying the components to summing amplifiers U-203 and U-204.

The four above-described potentials representing forces acting along the longitudinal axis of the flight path are summed in amplifier U-203, and divided by simulated aircraft mass by varying the feedback potentiometer R-218 of summing amplifier U-203 in accordance with simulated aircraft weight. As shown schematically, the arm of feedback impedance R-218 is varied by the trainer weight servo, aircraft weight being proportional to aircraft mass. Hence a potential proportional to longitudinal acceleration along the flight path appears at terminal 210. Since available aerodynamic data used in determining the magnitudes of the various potentials are ordinarily referred to as "stability axes," it is convenient to transform the forces to flight path axes and to transform the moments to airplane axes in order to compute the $x$, $y$ and $z$ coordinates of the airplane center of gravity in space and the three Euler angles $\psi$, $\theta$ and $\phi$, which determine the orientation of the aircraft with respect to the earth.

The forces acting along the lateral axis of the flight path are similarly summed in amplifier U-204 and similarly divided by aircraft mass by varying the feedback impedance R-219 of amplifier U-204 in accordance with simulated aircraft weight to provide a potential at terminal 211 proportional to simulated aircraft lateral acceleration along the flight path. The lateral force potentials summed in amplifier U-204 consist of a $W \cos \gamma \sin \phi$ potential representing the component of aircraft weight acting along the flight path lateral axis, a $D_s \sin \beta$ potential representing the component of aircraft drag acting along the flight path lateral axis, a $Y_s \cos \beta$ potential representing the side forces component acting along the lateral axis, and a $T \cos \alpha \sin \beta$ potential representing the component of thrust acting along the flight path lateral axis. A potential commensurate with lateral forces while the simulated aircraft is on the ground is derived as shown in Fig. 7 and applied via terminal 711.

Similarly, forces acting along the vertical axis of the flight path are summed in amplifier U-205 and are divided by aircraft mass by varying the feedback impedance R-220 of amplifier U-205 in accordance with simulated aircraft weight. The vertical forces potentials applied to amplifier U-205 consist of a $W \cos \gamma \cos \phi$ potential representative of the component of aircraft weight acting along the vertical axis of the flight path, a $T \sin \alpha$ potential proportional to the component of engine thrust acting along the vertical axis, and a $qSC_L$ potential representing simulated aircraft lift L, which acts along the vertical axis of the flight path. The lift potential is derived as shown by applying a constant potential at terminal 213, modifying the potential in accordance with dynamic pressure by means of potentiometer R-221, and further modifying the potential in accordance with coefficient of lift by means of potentiometer R-222. As indicated schematically, the arm of potentiometer R-222 is positioned by the trainer coefficient of lift servo M-505, the operation of which is explained in connection with Fig. 5. Also applied as an input potential to vertical forces summing amplifier U-205 is a "ground forces" potential derived as will be explained below in connection with Fig. 7 and applied to amplifier U-205 via terminal 701. This potential is applied as soon as the simulated wheels touch ground, and it increases as the aircraft weight settles on the wheels, simulating the flexing of the landing gear springs of the aircraft. Hence it will be seen that a potential commensurate with acceleration $a_z$ along the vertical axis of the flight path will appear at terminal 212. Connected to terminal 212 may be a conventional grounded trainer accelerometer indicator, which may comprise a simple meter movement or a position servo driving a pointer to indicate vertical acceleration in terms of "g," or gravity force units.

The vertical acceleration potential is also applied to excite the winding of potentiometer R-223, the arm of which is positioned by the trainer weight servo, serving to modify the acceleration potential in accordance with mass, to provide a vertical force potential $F_z$ at terminal 710. If desired, the vertical force potential $F_z$ may be derived by summing the weight, thrust, lift and ground forces inputs to amplifier U-205 in a separate summing amplifier (not shown). The vertical force potential at terminal 710 is used in computing ground forces, as will be described below in connection with Fig. 7.

Shown in Fig. 3 is the apparatus which receives the flight path acceleration potentials computed in Fig. 2 and derives potentials commensurate with ground speeds for operating conventional grounded trainer flight path recorders, rate of climb and altitude signals, and various other potentials utilized in the trainer. The $a_x$ potential commensurate with longitudinal acceleration along the flight path is applied to integrator I-301, which integrates the $a_x$ potential with respect to time, producing a potential $V_x$ proportional to the velocity of the aircraft along the longitudinal direction of the flight path. The velocity potential is resolved into components by potentiometers R-301 and R-302, both of which are positioned by the flight path elevation angle servo M-301. The potential proportional to the vertical component of flight path velocity appears on the arm of sine potentiometer R-302, and it is applied to the trainer rate of climb indicator I-RC, which may comprise a simple meter movement or a small position servo. Since there is considerable lag in an actual rate of climb indicator, capacitor C-301 is provided to slow down the response of indicator I-RC to changes in simulated rate of climb. The potential is also applied to integrator I-302, which integrates vertical velocity with respect to time and provides an altitude output potential $h$ to position altitude servo M-302, a position servo. If desired, position servo M-302 and integrator I-302 may be replaced by a velocity or integrating servo, as will be apparent to those skilled in the art. The horizontal component of flight path velocity $V_h$ from the arm of potentiometer R-301 is applied to ground speed servo M-303, which is thereby positioned to a position commensurate with the horizontal speed of the aircraft. The shaft of servo M-303 is used to position elements to be described below.

The flight path velocity potential $V_x$ is also resolved into "northerly" and "easterly" components by potentiometers R-305 and R-306, which are positioned by the flight path azimuth angle servo M-300, the operation of which is described below. The northerly and easterly components of flight path velocity are further resolved by potentiometers R-303 and R-304 to determine the horizontal component of north velocity $V_{hn}$ and the horizontal component of east velocity $V_{he}$. These latter potentials are integrated by integrators I-303 and I-304 respectively, and the output voltages from the integrators are utilized to position "distance north" servo M-304 and "distance east" servo M-305, respectively. As will be apparent, each of these integrator-position servo combinations may be replaced by a velocity servo, if desired. The shaft outputs of servos M-304 and M-305 represent northerly and easterly components of ground speed of the simulated aircraft, and the recording pen of a conventional grounded trainer flight path recorder may be actuated in usual manner in two perpendicular directions by these motors to plot on a standard aeronautical map the path of the simulated aircraft over the ground. The position of motors M-304 and M-305 will represent accurately the position of the simulated aircraft over a standard map or chart during both taxi-ing and flying. The shaft positions of servo motors M-304 and M-305 may also be utilized to actuate properly a grounded trainer visual display, since the motor shaft positions accurately indicate simulated aircraft position relative to a reference point on the ground at all times.

To compute the flight path azimuth angle to position servo M-300, the following equation is solved:

$$\dot{\psi}_p = \frac{1}{V_x}(a_y \cos \phi - a_z \sin \phi)\frac{1}{\cos \gamma}$$

The lateral acceleration potential $a_y$ derived as shown in Fig. 2 is applied to excite the winding of cosine potentiometer R-307, the arm of which is positioned by the trainer bank angle servo M-601, to apply an $a_y \cos \phi$ potential to summing amplifier U-301 commensurate with the horizontal component of centrifugal acceleration along the aircraft Y axis. The vertical acceleration potential $a_z$ derived as shown in Fig. 2 is applied to excite the winding of sine potentiometer R-308, the arm of which is positioned by servo M-601 in accordance with bank angle $\phi$, applying an $a_z \sin \phi$ potential to summing amplifier U-301 commensurate with the horizontal component of the centrifugal acceleration along the airplane z axis. The sum of the two potentials, which represents the quantity within brackets in the above expression, and which is the total horizontal component of centrifugal acceleration with respect to the earth, is applied to summing amplifier U-302, which has a feedback cosine potentiometer R-309 varied in accordance with simulated path elevation angle $\gamma$. The output potential of amplifier U-302 is applied to amplifier U-303, which has a feedback impedance varied by potentiometer R-310 in accordance with velocity along the simulated flight path $V_x$. Hence it will be seen that the output of amplifier U-301 will be divided by $\cos \gamma$ in amplifier U-302, and will be divided by $V_x$ in amplifier U-303, providing a rate of change of path azimuth angle potential $\dot{\psi}_p$ in accordance with the above expression. The rate of change of path azimuth angle potential is applied to integrator I-305, which integrates the potential with respect to time, producing a path azimuth angle potential $\psi_p$ to position path azimuth angle servo M–300.

Servo M–306 comprises a conventional position servo which receives a potential in accordance with aircraft velocity in the longitudinal direction of the flight path. The $V_x$ potential from integrator I–301 is applied to position servo M–306.

To compute the flight path elevation angle to position servo M–301, the following equation is solved:

$$-\dot{\gamma}=\frac{1}{V_x}(a_z \cos \phi + a_y \sin \phi + g \cos \gamma)$$

The bracketed terms of the equation are applied to summing amplifier U–304 from potentiometers R–312, R–313 and R–314 as shown in Fig. 3. Since the acceleration of gravity is a constant, potentiometer R–314 may be excited by a constant voltage from the computer power supply. The output potential from amplifier U–304 is divided in the circuit of amplifier U–305, which utilizes a feedback potentiometer R–315 positioned by servo motor M–306, producing a rate of change of path elevation angle $\dot{\gamma}$ in accordance with the above expression. The angular rate potential is integrated by integrator I–306 to provide a path elevation angle potential $\gamma$ to position path elevation angle servo M–301.

The lateral and vertical acceleration potentials $a_y$ and $a_z$ are applied to position ball angle servo M–307 in accordance with the ratio between the two potentials. The ball angle $\lambda$ of a conventional inclinometer may be expressed as:

$$\lambda = \tan^{-1} \frac{a_y}{a_z}$$

If the lateral acceleration potential $a_y$ is applied to the input of a conventional servo and the vertical acceleration potential $a_z$ is applied to excite the follow-up potentiometer of such a servo, the servo will position itself in accordance with the ratio between the two potentials, as will be apparent to those skilled in the art. The position of the servo shaft may be coupled to the ball of a conventional motor-positioned grounded trainer ball indicator by means of any conventional linear to arc tangent motion converting mechanism. Alternatively, as shown within dashed lines in Fig. 3, the follow-up potentiometer R–316 may comprise a tangent wound potentiometer which is excited by the vertical acceleration voltage $a_z$. Then the ball of the inclinometer or ball-bank indicator may be connected directly to the servo shaft.

Shown in Fig. 4 are the circuits and apparatus utilized to combine simulated aircraft speed relative to the ground with simulated wind relative to the ground, so as to obtain a true dynamic pressure potential at all times for use in computing the aerodynamics of the simulated aircraft. The potential $V_h$ proportional to aircraft horizontal speed relative to the ground is derived as explained above in relation to Fig. 3 to position ground speed servo M–303. The potential is also applied to excite the winding of potentiometers R–401 and R–402. The arm of potentiometer R–401 is positioned by the ground speed servo M–303, and hence a potential proportional to $V_h^2$ is applied via conductor 401 to summing amplifier U–401. Potentiometer R–403 is excited by a constant voltage and its output is applied to excite potentiometer R–404. Since both of these potentiometers are positioned by the instructor in accordance with simulated wind velocity $V_w$, a $(V_w^2)$ potential is applied to summing amplifier U–401 via conductor 402. The potential on the arm of potentiometer R–402 ($V_hV_w$) is applied to excite cosine potentiometer R–405. The arm of potentiometer R–405 is positioned in accordance with the angle $\psi_{pw}$ between wind direction $\psi_w$ and flight path azimuth $\psi_p$ by the output of differential 405, which receives shaft inputs from the trainer path azimuth angle servo M–300, and the instructor's wind direction control knob. The potential on the arm of cosine potentiometer R–405 is inverted in phase by amplifier U–402, and hence a potential proportional to $-2 V_h V_w \cos \psi_{pw}$ is applied to summing amplifier U–401 via conductor 403. Since $V_h$ and $V_w$ represent aircraft and wind velocity vectors, and since $\psi_{pw}$ represents the angle between the vectors, it may be seen that the resultant of such vectors, speed of the aircraft with respect to the air $(V_p)$ may be computed by the law of cosines:

$$V_p^2 = V_h^2 + V_w^2 - 2V_hV_w \cos \psi_{pw}$$

The right-hand side of the expression is supplied to summing amplifier U–401 as explained above, and hence a potential proportional to $V_p^2$ is produced at the output circuit of amplifier U–401. This "airspeed squared" potential is applied to position airspeed servo M–400. Servo M–400 is conventional except that it is equipped with "squaring" follow-up means, so that its shaft position is a linear measure of $V_p$. For example, the follow-up potential for servo M–400 may be derived on conductor 406 by means of potentiometers R–406 and R–407, both of which are positioned by servo M–400.

The dynamic pressure "$q$" exerted per unit area on a moving aircraft may be expressed as:

$$q = \tfrac{1}{2} \rho V_p^2$$

where $\rho$ = air density. Since air density is a function of altitude, dynamic pressure may be computed by modifying the $V_p^2$ potential output from amplifier U–401 in accordance with altitude. This is done as shown in Fig. 4 by potentiometer R–408, the arm of which is positioned by altitude servo M–302. The potential on the arm of potentiometer R–408 positions dynamic pressure servo M–401, the output shaft of which positions numerous potentiometers mentioned above and below. Airspeed servo M–400 positions the arm of potentiometer R–409, applying a potential proportional to airspeed to summing amplifier U–403. The feedback impedance of amplifier U–403 is varied inversely by potentiometer R–410 in accordance with the speed of sound, which is a function of altitude, which serves to divide airspeed by altitude, to provide a potential proportional to Mach number to position Mach number servo M–402. Potentiometer R–408 is non-linearly wound or shunted with "padding" resistances so as to provide a function representing the variation of air density with altitude. Mach number is the ratio of aircraft speed to the speed of sound at altitude. In simulation of rough air conditions, the arms of potentiometers R–403 and R–404 may be varied in position in random fashion by the instructor to simulate erratic changes in wind velocity, and the wind direction shaft input to differential 405 may be varied similarly to simulate erratic changes in wind direction. As will be apparent to those skilled in the art, either or both of these variations may be generated by motor-driven cams in conventional grounded trainer fashion.

Figure 5:
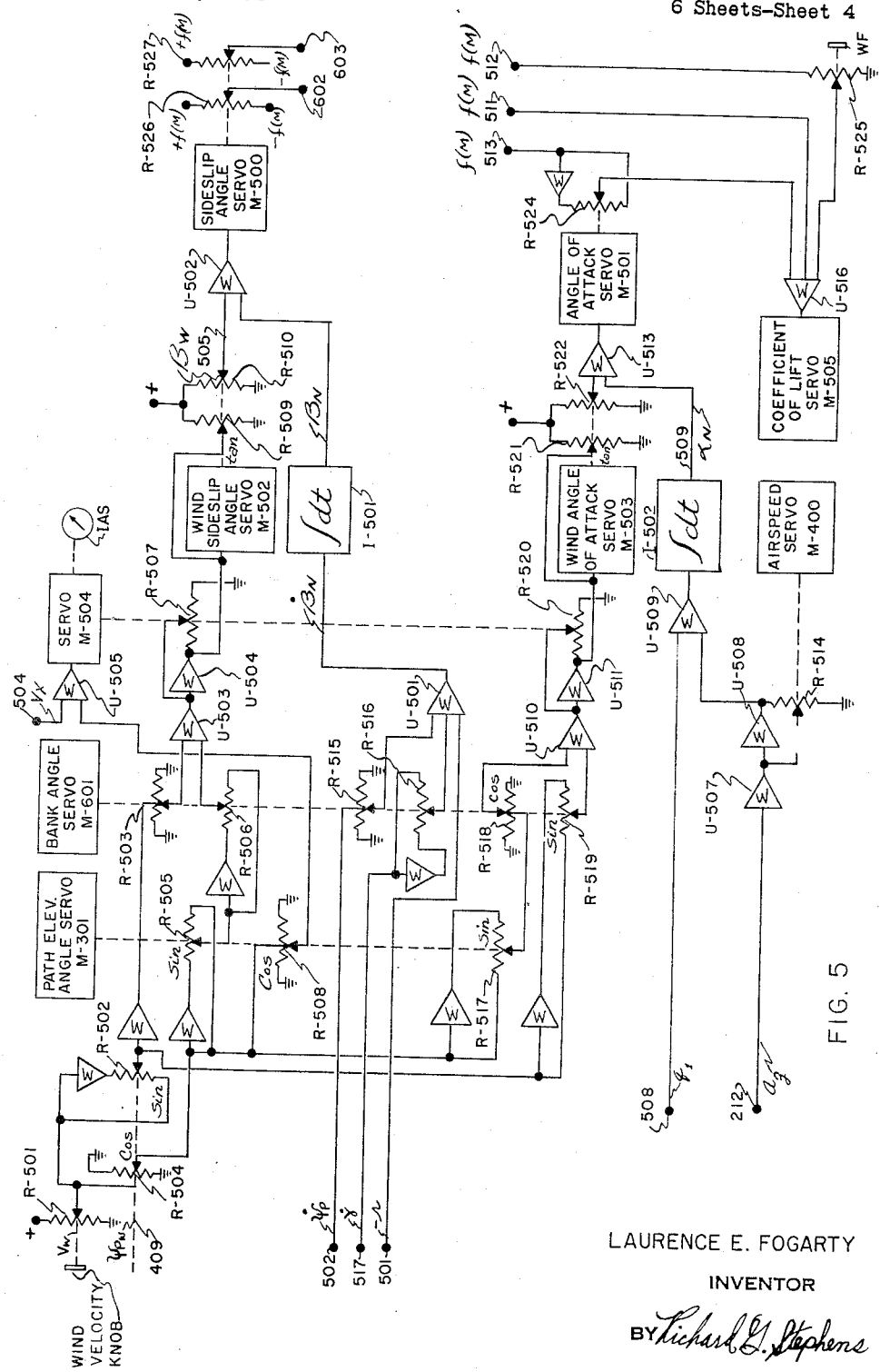
Fig. 5 is an electrical schematic diagram of the sideslip angle and angle of attack computer portions of my invention together with associated apparatus.

Shown in Fig. 5 is apparatus utilized for computing sideslip angle and angle of attack for use in aerodynamic computations to be described below, as well as those already described above. The sideslip angle is computed by adding sideslip angle due to wind ($\beta_w$) to ordinary sideslip angle $\beta_n$, which latter angle expresses sideslip not generated by wind, but by the aerodynamic forces and moments which would cause sideslip in the absence of any wind. The angles are computed both while the simulated aircraft is grounded and while it is airborne, and the effect of wind on sideslip angle during crosswind takeoffs and landings is realistically simulated.

Ordinary sideslip angle $\beta_n$ may be expressed as the integral of:

$$\dot{\beta}_n = -r + \dot{\psi}_p \cos \phi - \dot{\gamma} \sin \phi$$

Since sideslip angle $\beta_N$ is the angle between aircraft heading and the longitudinal direction of the flight path, the rate of change of sideslip angle ($\dot{\beta}_N$) may be seen to be commensurate with the difference between rate of change of aircraft heading with respect to the flight path (termed yawing rate $r$) and the rate of change of direction or angular velocity of the longitudinal axis of the flight path ($\dot{\psi}_p \cos \phi - \dot{\gamma} \sin \phi$). The angular velocity of the longitudinal axis of the flight path may be seen to be composed of a horizontal component $\dot{\psi}_p \cos \phi$ and a vertical component $\dot{\gamma} \sin \phi$.

Figure 6:
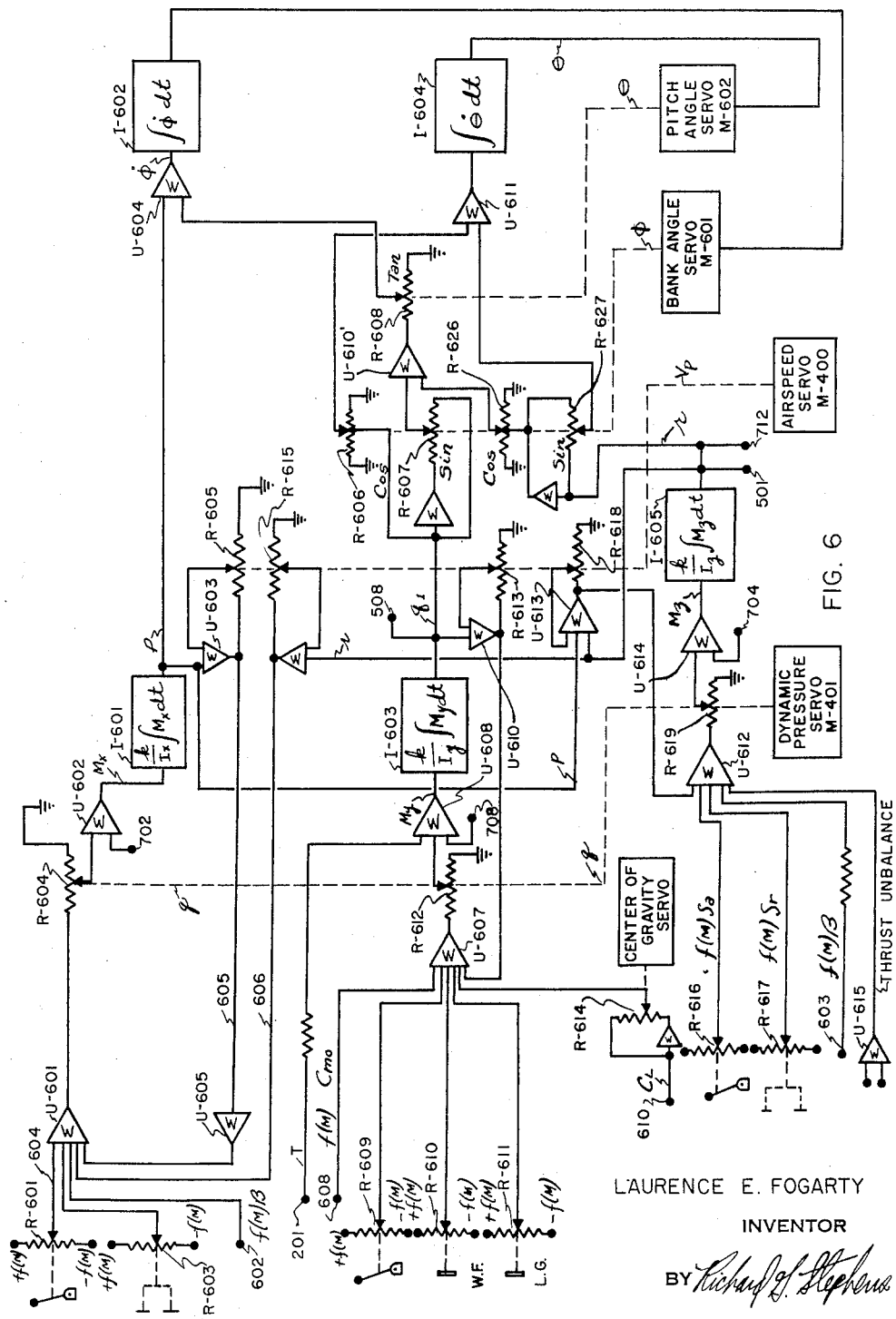
Fig. 6 is an electrical schematic diagram of the aerodynamic forces and moments computer portion of the invention together with associated apparatus.

In Fig. 5 potentials commensurate with the quantities in the above expression are derived and applied to summing amplifier U-501. A yawing rate potential derived as shown in Fig. 6 is applied to amplifier U-501 via terminal 501. A rate of change of flight path elevation angle $\dot{\gamma}$ potential derived as shown in Fig. 3 is applied via terminal 517 to excite the winding of sine potentiometer R-516, the arm of which is positioned by the trainer bank angle servo M-601, applying a $\dot{\gamma} \sin \phi$ potential to amplifier U-501. A rate of change of flight path azimuth angle potential $\dot{\psi}_p$ derived as shown in Fig. 3 is applied at terminal 502 to excite the winding of cosine potentiometer R-515, the arm of which is also positioned by the trainer bank angle servo M-601, applying a $\dot{\psi}_p \cos \phi$ potential to amplifier U-501. The output potential, which equals the rate of change of sideslip angle ($\dot{\beta}_N$) is integrated by integrator I-501 with respect to time, to provide a $\beta_N$ potential, which is applied to summing amplifier U-502.

The sideslip angle of an aircraft may be expressed as the angle whose tangent is the ratio of aircraft speed relative to the air along the flight path lateral axis to aircraft speed relative to the air along the flight path longitudinal axis, or $$\beta = \text{arc tan} \frac{V_{py}}{V_{px}}$$

where $V_{py}$=airspeed along the flight path lateral or Y axis.
$V_{px}$=airspeed along the flight path longitudinal or X axis.

If an aircraft is parked on the ground, the sideslip angle generated by a horizontally blowing wind may be seen to be $$\beta = \text{arc tan} \frac{V_{yw}}{V_{xw}}$$

where $V_{yw}$=wind velocity along the Y axis.
$V_{xw}$=wind velocity along the X axis.

If the aircraft then moves at a velocity $V_x$ in the longitudinal direction of its flight path, the resulting sideslip angle due to the wind may be seen to be:

$$\beta_w = \text{arc tan} \frac{V_{yw}}{V_x + V_{xw}}$$

Assuming the wind to blow horizontally, the wind velocity component $V_{yw}$ along the lateral axis of the flight path may be seen to consist of a $-V_w \sin \psi_{pw} \cos \phi$ component and a $V_w \cos \psi_{pw} \sin \phi \sin \gamma$ component, or:

$$V_{yw} = V_w(-\sin \psi_{pw} \cos \phi + \cos \psi_{pw} \sin \phi \sin \gamma)$$

Similarly, the wind velocity component $V_{xw}$ along the lateral axis of the flight path may be seen to consist of a $V_w \cos \psi_{pw} \cos \gamma$ quantity. Hence the angle of sideslip due to wind may be expressed as:

$$\beta_w = \text{arc tan} \frac{V_w(-\sin \psi_{pw} \cos \phi + \cos \psi_{pw} \sin \phi \sin \gamma)}{V_x + V_w \cos \psi_{pw} \cos \gamma}$$

In the apparatus of Fig. 5, the numerator of the above expression is applied in components to summing amplifier U-503. A potential commensurate with $-V_w \sin \psi_{pw} \cos \phi$ is derived by means of potentiometers R-501, R-502, and R-503 in the manner shown. A constant potential from the computer power supply is applied to excite the winding of potentiometer R-501, the arm of which is positioned by the instructor in accordance with the velocity of the wind he desires to introduce into the flight instruction problem, applying opposite polarity $V_w$ potentials to excite the winding of sine potentiometer R-502, the arm of which is positioned in accordance with $\psi_{pw}$ by the output shaft 409 of differential 405 of Fig. 4, to apply an excitation potential to cosine potentiometer R-503, the arm of which is positioned by the trainer bank angle servo M-601. The $-V_w \sin \psi_{pw} \cos \phi$ potential on the arm of potentiometer R-503 is connected to summing amplifier U-503. In similar manner a $V_w \cos \psi_{pw} \sin \phi \sin \gamma$ potential is derived by potentiometers R-501, R-504, R-505 and R-506, and is applied to summing amplifier U-503. A $V_w \cos \psi_{pw} \cos \gamma$ potential ($V_{xw}$) is similarly derived by potentiometers R-501, R-504 and R-508 and is applied to summing amplifier U-505 together with a $V_x$ potential derived as shown in Fig. 3 and applied via terminal 504 to provide an output potential commensurate with the denominator of the above expression. The output potential from summing amplifier U-505 is applied to position servo M-504 in accordance with total airspeed along the longitudinal axis of the flight path. The potential commensurate with $V_{yw}$ from amplifier U-503 is applied to feedback amplifier U-504, the feedback impedance R-507 of which is positioned as indicated by servo M-504. As will be apparent, this serves to accomplish the division, providing an output potential from amplifier U-504 commensurate with arc tan $\beta_w$. This potential is applied to position the wind sideslip angle servo M-502 in accordance with $\beta_w$, servo M-502 being provided with a tangent function follow-up potentiometer R-509. Hence it will be seen that the arm of potentiometer R-510 is positioned in accordance with $\beta_w$, applying a potential commensurate with sideslip angle due to wind to summing amplifier U-502 via conductor 505. The $\beta_N$ and $\beta_w$ potentials are summed in amplifier U-502, providing a potential commensurate with actual sideslip angle to position sideslip angle servo M-500. The shaft of servo M-500 serves to position the arms of potentiometers R-526 and R-527 to derive potentials for use in the aerodynamic computations to be explained in connection with Fig. 6, as well as to position other potentiometers described elsewhere.

The actual angle of attack of the simulated aircraft is equal to the angle of attack $\alpha_N$ due to aerodynamic forces and moments in the absence of wind plus the angle of attack due to wind $\alpha_w$. The ordinary angle of attack $\alpha_N$ is the angle taken about the lateral or Y axis of the flight path between the direction in which the aircraft is heading (pitch angle) and the direction in which it is traveling (flight path elevation angle). The rate of change of such angle $\dot{\alpha}_N$ may be seen to equal the sum or difference between the rate at which the aircraft pitches about its own axis $q_1$ and the rate at which the path elevation angle changes $$\frac{A_z}{V_p}$$

or:

$$\dot{\alpha}_N = q_1 + \frac{A_z}{V_p}$$

$$\alpha_N = \int_0^{} \left(q_1 + \frac{a_z}{V_p}\right) dt$$

In Fig. 5 a pitching rate potential $q_1$ is applied to summing amplifier U-509 from terminal 508. The potential is derived as will be explained in connection with Fig. 6. A vertical acceleration potential $A_z$ derived as shown in Fig. 2 is applied via terminal 212 and summing amplifier U-507 to amplifier U-508, the feedback impedance R-514 of which is varied in accordance with simulated airspeed by servo M-400, serving to provide an $$\frac{A_z}{V_p}$$

potential at the output of amplifier U-508 for application to summing amplifier U-509. The sum of the applied potentials represents rate of change of angle of attack $\dot{\alpha}_N$ as shown above. The summed output from amplifier U-509 is integrated with respect to time by integrator I-502, providing an $\alpha_N$ potential on conductor 509 to feed amplifier U-513.

The computation of angle of attack due to wind $\alpha_w$ is done similarly to that of sideslip angle due to wind, the wind velocities involved merely being with respect to the vertical rather than lateral axis. By analogy to the sideslip computation, angle of attack due to wind may be seen to equal:

$$\alpha_w = \arctan \frac{V_{zw}}{V_x + V_{xw}}$$

where $V_{zw}$ = the wind velocity component along the Z axis of the aircraft. The $V_{zw}$ component may be seen to consist of a $V_w \sin \psi_{fw} \sin \phi$ component and a $V_w \cos \psi_{pw} \cos \phi \cos \gamma$ component. Hence $\alpha_w$ may be expressed as:

$$\alpha_w = \arctan \frac{V_w(\sin \psi_{pw} \sin \phi + \cos \psi_{pw} \cos \phi \sin \gamma)}{V_x + V_w \cos \psi_{pw} \cos \gamma}$$

In Fig. 5 the numerator of the fraction in the above expression is computed by applying a $V_w \sin \psi_{pw} \sin \phi$ potential and a $V_w \cos \psi_{pw} \cos \phi \sin \gamma$ potential to summing amplifier U-510. The $V_w \sin \psi_{pw} \sin \phi$ potential is derived by potentiometers R-501, R-502, and R-519. The $V_w \cos \psi_{pw} \cos \phi \sin \gamma$ potential is derived by potentiometers R-501, R-504, R-517 and R-518. The output potential from amplifier U-510 is applied to amplifier U-511, the feedback impedance R-520 of which is varied in accordance with the denominator of the above expression by servo M-504, serving to provide a potential proportional to the quotient of the fraction at the output circuit of amplifier U-511. This potential is applied to position wind angle of attack servo M-503 in accordance with $\alpha_w$, the tangent function follow-up potentiometer R-521 serving to eliminate the "arc tangent" from the output quantity. Potentiometer R-522 is thusly positioned in accordance with $\alpha_w$, applying a potential commensurate with $\alpha_w$ to summing amplifier U-513. The output potential from amplifier U-513, which represents the total angle of attack, is applied to position angle of attack servo M-501.

The coefficient of lift $C_L$ of an aircraft may be expressed as:

$$C_L = [C_{L_{\alpha_0}} + C_{L_\alpha} + C_{L_{\delta_{WF}}} \delta_{WF} + \cdots]$$

Each of the various components which add together to determine coefficient of lift are functions of Mach number. In trainers designed to simulate low speed aircraft the components may be considered constant, but in trainers designed to simulate high speed and high altitude aircraft, it is quite desirable to schedule such components with Mach number. In Fig. 5 a potential which varies in accordance with Mach number is applied to terminal 511 from potentiometer R-414 of Fig. 4. This potential, which is applied directly to summing amplifier U-516, represents the $$C_{L_{\alpha_0}}$$

portion of the total lift coefficient, which in turn represents the basic coefficient of lift when angle of attack of the simulated aircraft is zero. Another function of Mach number potential is applied via terminal 513 to excite potentiometer R-524, the arm of which is positioned in accordance with angle of attack by servo M-501, to supply a potential commensurate with the $C_{L_\alpha} \alpha$ component of the lift coefficient to amplifier U-516. A third function of Mach number potential is derived (by potentiometer R-415 of Fig. 4) and applied to wing flaps potentiometer R-525 via terminal 512 to supply the $$C_{L_{\delta_{WF}}} \delta_{WF}$$

component of the total lift coefficient to summing amplifier U-516. Potentiometer R-525 is positioned by the student's wing flaps control WF. It will be apparent that the effect on coefficient of lift of other equipment (for example, divebrakes) may be simulated by provision of additional circuits similar to that of the wing flaps control. The various potentials representing the components of lift coefficient are summed in amplifier U-516, and the output potential is utilized to position the coefficient of lift servo M-505. It will be apparent to those skilled in the art that if it is not desired to simulate the change in lift coefficient with change in Mach number, that constant potentials from the power supply may be substituted for the $f(M)$ potentials utilized.

Shown schematically in Fig. 6 is apparatus utilized in computing aerodynamic moments, angular rates, and angles about the axes of the simulated aircraft. Moments about the longitudinal or X axis of the aircraft tend to cause the aircraft to bank. The total banking moment about the X axis of an aircraft in flight might be expressed as:

$$M_x = qSbC_{l_{tot}}$$

where $q$ = dynamic pressure
$S$ = representative or nominal wing area
$b$ = representative or nominal wing span
$C_{l_{tot}}$ = total rolling moment coefficient The total rolling moment coefficient map be expressed in terms of control movements and other phenomena which impart rolling moments to an aircraft, as, for example:

$$C_{l_{tot}} = \left[ C_{l_{\delta_a}} \delta_a + C_{l_{\delta_\gamma}} \delta_\gamma + C_{l_\beta} \beta + C_{l_p} \frac{Pb}{2V_p} + C_{l_r} \frac{rb}{2V_p} + \cdots \right]$$

The rolling moment due to aileron deflection is effected by the $$C_{l_{\delta_a}} \delta_a$$

term, which may be termed "aileron effectiveness." Since the rudder on most aircraft is not symmetrically located on the aircraft X axis, but rather is mounted somewhat above such axis, rudder deflection causes a banking moment which is expressed as $$C_{l_{\delta_\gamma}} \delta_\gamma$$

Sideslip angle causes greater lift on one wing than on the other because of dihedral in the wings, causing a rolling moment represented by the term $C_{l_\beta} \beta$. A damping term $$C_{l_p} \frac{Pb}{2V_p}$$

represents the roll damping or rolling moment resisting rolling velocity, and it will be apparent that such damping would be a function of rolling velocity $p$, wing span $b$, and airspeed $V_p$, arc tan $$\frac{Pb}{2V_p}$$

representing the helix angle made by the wing as the aircraft rolls. If the aircraft is yawing, it will be seen that one wing travels faster than the other, acquiring more lift than the other, and hence imparting a rolling moment to the aircraft. Each of the $C_l$ coefficients in the above terms is ordinarily determined from wind tunnel test measurements or from calculations. Such coefficients are actually functions of Mach number as well as being affected by airplane configuration, and in trainers constructed to simulate high speed aircraft, it is deemed desirable to vary such coefficients in accordance with Mach number.

In Fig. 6 an $f(M)$ potential is applied to excite potentiometer R-601, the arm of which is positioned by the student's aileron control in conventional grounded trainer fashion. Hence it may be seen that if the $f(M)$ potential represents the "aileron effectiveness" coefficient, that a potential commensurate with $$C_{l_{\delta_a}} \delta_a$$

will be applied to summing amplifier U-601 via conductor 604. A potential commensurate with $$C_{l_{\delta_\gamma}} \delta_\gamma$$

is similarly derived by potentiometer R-603 and applied to summing amplifier U-601, the arm of potentiometer R-603 being positioned by the trainer rudder pedals. It will be apparent that such a potential may be derived in accordance with Mach number by applying $f(M)$ potentials to potentiometer R-603 in the same manner that the "aileron effectiveness" coefficient potential was derived. A potential proportional to sideslip angle $\beta$ (derived in accordance with Mach number as shown in Fig. 5) is applied to summing amplifier U-601 via terminal 602 to effect the $C_{l_\beta}\beta$ term of the rolling moment coefficients. The roll damping term $$C_{l_p} \frac{pb}{2V_p}$$

is applied to amplifier U-601 via conductor 605. The "rolling moment due to yawing" term $$C_{l_r} \frac{rb}{2V_p}$$

is applied to amplifier U-601 via conductor 606. It will be apparent that each of the latter potentials may be modified in accordance with Mach number by potentiometers (omitted for sake of clarity) positioned in accordance with Mach number by servo M-402. The variation of such coefficients with Mach number is often somewhat non-linear, and hence non-linear potentiometers should be provided for generating the $f(M)$ potentials and for varying the other input potentials. The various inputs to amplifier U-601 are summed, providing an output potential form U-601 proportional to the total rolling moment coefficient $C_{l_{tot}}$. The $C_{l_{tot}}$ potential from amplifier U-601 is applied to excite potentiometer R-604, the arm of which is positioned by the trainer dynamic pressure servo M-401, applying a potential proportional to $qSbC_{l_{tot}}$ to the input circuit of integrator I-606 via summing amplifier U-602. (Wing area S and wing span $b$ are constants, and may be effected by appropriate scaling.) As shown above, this input potential is commensurate with rolling moments, and as integrator I-601 integrates the moments with respect to time, a rolling velocity potential $p$ will be provided by integrator I-601. Also applied to amplifier U-602 and hence integrator I-601 is a ground forces rolling moments potential derived as shown in Fig. 7 and applied at terminal 702. This potential is applied only when one wheel touches the ground before the other, or whenever turning on the ground causes a rolling moment.

The rate of roll potential $p$ is applied to amplifier U-603, the feedback impedance R-605 of which is varied in accordance with airspeed by servo M-400. The output potential from amplifier U-603 is hence proportional to $$\frac{p}{V_p}$$

and a $$C_{l_p} \frac{pb}{2V_p}$$

damping potential is supplied for application to amplifier U-601 via conductor 605 as mentioned above. Since wing span $b$ and 2 are constants, they may be effected by appropriate resistance scaling, and as mentioned above, the $C_{l_p}$ coefficient may be scheduled with Mach number if desired.

The rate of roll potential $p$ from integrator I-601 is also applied to summing amplifier U-604. Being referenced to aircraft axes, the rate of roll $p$ differs from the rate of change of bank angle $\dot\phi$ by a quantity $$(q_1 \sin\phi + r \cos\phi) \tan\theta$$

bank angle being taken with respect to the earth, and hence a $(q_1 \sin\phi + r \cos\phi) \tan\theta$ potential is also applied to summing amplifier U-604. A potential proportional to pitching rate $q_1$ derived as will be explained below is resolved by potentiometers R-606 and R-607 in accordance with bank angle. The component commensurate with $q \sin\phi$ is applied to the input circuit of amplifier U-610′, together with a potential commensurate with $r \cos\phi$ from the potentiometer R-626, the winding of which is excited with a rate of yaw or $r$ potential, and the arm of which is also positioned by the trainer bank angle servo M-601. The output of amplifier U-610′ is modified in accordance with $\tan\theta$ by potentiometer R-608, and applied to amplifier U-604. The output potential from amplifier U-604 is hence commensurate with rate of change of bank angle $\dot\phi$. This potential is integrated with respect to time by integrator I-602, providing an output potential to position the trainer bank angle servo M-601. The bank angle servo M-601 may position the horizon bar of a simulated gyro horizon instrument (not shown) in conventional grounded trainer manner, and may be used for positioning a visual image relative to the cockpit in conventional grounded trainer visual displays.

A somewhat similar system to that described above is utilized for computing trainer pitching moments rates and angles. Aircraft pitching moments about the lateral or Y axis of the aircraft may be expressed as:

$$M_y = qS_c\left[C_{m_0} + C_{m_{c1}}\frac{X_{cg}}{c}C_1 + C_{m_{q1}}\frac{q_1 C}{V_p} + C_{m_{\delta_e}}\delta_e + C_{m_{fw}}\delta_{fw} + C_{m_{1g}}\delta_{1g}\right] + kT$$

where $c$ = wing chord
$X_{cg}$ = distance from aircraft center of gravity to the point about which the pitching moment coefficients are measured or calculated
$T$ = thrust The $C_{m_0}$ term of the total pitching moment coefficient effects simulation of a basic or constant pitching moment. The $$C_{m_{c1}}\frac{X_{cg}}{C}C_1$$

term represents pitching moments due to lift force L acting a lever arm distance $X_{cg}$ from the center of gravity of the aircraft. The $$C_{m_{q1}}\frac{q_1 c}{V_p}$$

represents resistance or pitch damping due to pitching velocity. The $C_{m_{\delta e}}\delta_e$, $C_{m_{fw}}\delta_{Fw}$, and $C_{m_{1g}}\delta_{1g}$ terms represent the portion of the total pitching moment coefficient due to elevator deflection, wing flap deflection and landing gear position, respectively. The KT term represents the pitching moment due to engine thrust, since engine thrust does not usually act exactly through the lateral axis of the center of gravity of aircraft, and hence a pitching moment proportional to thrust T occurs. The coefficients are derived in a manner similar to that described in connection with rolling moment coefficients and are applied to summing amplifier U-608. The constant term $C_{m_0}$ may be effected by provision of a constant potential from terminal 608. The elevator, wing flaps, and landing gear effectiveness coefficients are derived as shown by potentiometers R-609, R-610 and R-611 respectively, which are positioned by the student's manipulation of their associated controls. The $$C_{m_{c1}}\left(\frac{X_{cg}}{c}\right)C_1$$

term is derived as shown by applying a potential commensurate with coefficient of lift from terminal 610 to the winding of potentiometer R-614, the arm of which may be positioned in accordance with the location of the center of gravity of the simulated aircraft either manually by the instructor, but preferably by a conventional grounded trainer center of gravity servo. Each of these input potentials to amplifier U-607 may be modified in accordance with Mach number in the manner mentioned above by means of Mach number servo M-402. The total pitching moment coefficient potential output from summing amplifier U-607 is applied to excite the winding of potentiometer R-612, the arm of which is positioned in accordance with dynamic pressure by servo M-401, applying a pitching moment potential to summing amplifier U-608. The pitching moment due to engine thrust is applied from terminal 201 to amplifier U-608. Hence the output potential of summing amplifier U-608 is proportional to pitching moments about the lateral axis of the aircraft. When the simulated aircraft touches ground, a potential commensurate with pitching moments due to ground forces (e.g., braking) derived as shown and explained in connection with Fig. 7 is applied to summing amplifier U-608 via terminal 703.

The output potential from amplifier U-608 is integrated with respect to time by integrator I-603, providing an output potential $q_1$ proportional to pitching rate. The $q_1$ potential is applied to the circuit of summing amplifier U-610 to be divided by airspeed $V_p$, the feedback impedance R-613 of amplifier U-610 being varied in accordance with airspeed by servo M-400. Hence a potential commensurate with $$C_{m_{q1}}\frac{q_1 c}{V_p}$$

is available to provide the damping term to summing amplifier U-607.

The pitching velocity $\dot{\theta}$ of an aircraft with respect to the horizontal differs from its pitching rate $q_1$ with respect to its own axes and equals the quantity $$(q_1 \cos \phi - r \sin \phi)$$

The pitching velocity potential $q_1$ is applied to excite cosine potentiometer R-606, the arm of which is positioned by the trainer bank angle servo M-601. A yawing velocity potential $r$, the derivation of which will be explained below is applied to excite sine potentiometer R-627, and hence potentials having a sum equal to pitching velocity with respect to the horizontal, or $\dot{\theta}$ are applied to summing amplifier U-611. The output potential $\dot{\theta}$ is integrated by integrator I-604 to provide a potential to position pitch angle servo M-602. The output shaft of servo M-602 may be used to position the pitch bar of a simulated gyro horizon (not shown) in conventional grounded trainer fashion, and may be used to actuate pitching apparatus of grounded trainer visual displays.

The apparatus shown in the lower portion of Fig. 6 computes yawing moments and yawing rate in a manner analogous to the computation of banking and pitching moments and rates. The yawing moments of an aircraft in flight may be expressed as:

$$M_z = qS_b\left[C_{n_{\delta_a}}\delta_a + C_{n_{\delta_r}}\delta_r + C_{n_\beta}\beta + C_{n_p}\frac{Pb}{2V_p} + C_{n_r}\frac{rb}{2V_p} + \cdots\right]$$

The first three coefficients within the brackets represent aileron yawing coefficient, rudder yawing coefficient and yawing coefficient due to sideslip, respectively. The $$C_{n_p}\frac{Pb}{2V_p}$$

term represents yawing moment coefficient due to banking velocity, and the $$C_{n_r}\frac{rb}{2V_p}$$

is the damping term representing resistance to yawing due to yawing velocity. Potentials proportional to the first three coefficients are fed to summing amplifier U-612 from potentiometer R-616, R-617 and terminal 603, respectively. A potential proportional to the latter two terms is provided by applying rolling velocity $p$ and yawing velocity $r$ potentials to summing amplifier U-613 and by dividing the output potentials of amplifier U-613 by varying its feedback impedance R-618 in accordance with airspeed by means of servo M-400. As in the cases of banking and pitching moment coefficients, the yawing moment coefficients may be modified in accordance with Mach number before being applied to summing amplifier U-612. In multi-engine aircraft unequal thrust from left and right engines causes a yawing moment. To simulate such condition, potentials proportional to the thrust of the individual engines derived from conventional grounded trainer engine computers are applied in opposite sense to summing amplifier U-615. The output potential from amplifier U-615 represents the thrust unbalance, with which the yawing moment is proportional. In trainers constructed to simulate aircraft having multiple engines, the scaling resistors of the thrust unbalance amplifiers should be selected in accordance with the "lever arm" distances between the respective engine thrust axes and the longitudinal axis of the aircraft. The coefficient potentials are summed in amplifier U-612 and applied to excite the winding of potentiometer R-619, providing a potential input commensurate with yawing moments to integrator I-605 via amplifier U-614. Potentials to commensurate with yawing moments due to ground forces are applied to amplifier U-614 from terminal 704. The yawing moments potential $M_z$ is integrated with respect to time in integrator I-605, providing a rate of yawing potential $r$ at its output terminal. This potential is utilized as described above for computing sideslip angle and heading.

Shown in Fig. 7 is apparatus utilized in computing forces and moments caused by contact of the wheels of the simulated aircraft with the ground or runway. The magnitudes of such forces and moments are proportional to the total vertical force on the aircraft as it touches the ground or runway. A potential commensurate with such force is derived as shown in Fig. 2 and is applied via terminal 710 to excite potentiometers R-701 and R-702, the arms of which are positioned by the student with the left and right brake pedals of the simulated aircraft. The braking force exerted by each wheel may be seen to be a function of both vertical force on the wheel and brake pedal deflection, so that potentials proportional to the braking force of each wheel are applied to summing amplifier U-702 through relay contacts presently to be described, providing a potential output from amplifier U-702 proportional to the braking force of both wheels of the main landing gear of the simulated aircraft. The individual wheel braking force potentials are routed to amplifier U-702 via the contacts of relays K-701 and K-702 to simulate the braking forces applied when the aircraft is banked, so that only one wheel of the main landing gear of the simulated aircraft touches ground. Positive and negative supply voltages are applied to excite the winding of potentiometer R-703, the arm of which is positioned by the trainer angle of bank servo M-601. The voltage on the arm of potentiometer R-703 is applied to the coils of relays K-701 and K-702 through oppositely-poled rectifiers X-701 and X-702, respectively. Hence if the simulated aircraft banks to the left, so that the right wheel would be above the ground, angle of bank servo M-601 would drive the arm of potentiometer R-703 upwardly as viewed in Fig. 7, applying a positive voltage to the coil of relay K-701 through rectifier X-701. Since rectifier X-702 is oppositely-poled, no current would flow to relay K-702. When the simulated aircraft has banked sufficiently, the current to relay K-701 will be sufficient to operate the relay, opening its normally closed contact "a" and closing its normally open contact "b." The opening of contact "a" disconnects the right wheel braking force potential from amplifier U-702. Since the lifting of the right wheel off the runway puts the total vertical force on the left wheel, the braking force on the left wheel becomes greater. The increase in the left wheel braking force is simulated by the closure of contact "b" of relay K-701, which shorts out resistance R-704, increasing the left wheel braking force potential applied to amplifier U-702. If the simulated aircraft banks to the right, the converse operation will occur, relay K-702 operating instead of relay K-701.

The braking force potentials from each wheel braking circuit are applied through normally closed contacts "a" of polarity sensitive relays PSRL and PSRR, respectively, to amplifier U-702. The maximum amount of braking which may be applied without skidding is a function of vertical force on the wheel concerned. Therefore a potential commensurate with vertical force is applied as one input to each of polarity-sensitive relays PSRL and PSRR, and potentials proportional to braking force exerted on each wheel are applied in opposite sense. Assuming that the maximum permissible amount of braking is not exceeded, contacts "a" of the polarity sensitive relays remain closed, applying the braking force potentials to amplifier U-702. Assuming that the maximum permissible braking force is exceeded, the braking force potential will exceed the vertical force potential, changing the resultant polarity of the input to the particular relay, opening its contact "a" and closing its contact "b." Such switching operation interrupts the braking force potential and substitutes a "skidding" potential, which is proportional to the vertical force on the aircraft, via contact "b" of the polarity sensitive relay. The potential input to amplifier U-702 may be seen to be commensurate with total braking force (or retarding force due to skidding) derived by operation of both the left and right brake pedals. Switch S-WW is operated as shown schematically by the trainer altitude servo, a cam (not shown) being provided on the servo shaft to close the switch contacts shown when simulated altitude becomes zero, and to maintain the contacts closed while the simulated aircraft is on the ground. Hence it may be seen that while the simulated aircraft is on the ground, a potential commensurate with total braking forces (or skidding, if such occurs) is applied via contact 7a of switch S-WW to the drag forces summing amplifier U-202 (see Fig. 2) via summing amplifier U-208. The potential on contact 7a of switch S-WW is also applied to summing amplifier U-703, to be applied as an input to pitching moments summing amplifier U-608 via terminal 703. As will be apparent, the application of braking forces also causes an aircraft to pitch forward, and the simulation of such phenomenon is accomplished as shown by providing an input potential to the pitching moments computer circuit proportional to the total braking force.

If the pilot of an actual aircraft applies unequal braking forces to the left and right wheels of the aircraft, it will be apparent that the aircraft will yaw, the amount of yawing depending upon the difference in the two braking forces. Actually, any well-known aircraft are steered in such a manner while on the ground. In order to simulate yawing due to unbalanced or differential brake application, the left wheel and right wheel braking force potentials are applied in opposite sense to summing amplifier U-705, amplifier U-706 serving to reverse the polarity of the left wheel braking force potential. A differential braking force potential thereby appears at the output circuit of amplifier U-705. Since the yawing moment is directly proportional to the differential braking force, the output potential of amplifier U-705 is applied via contact 7b of switch S-WW to amplifier U-704, the output of which is applied to yawing moments summing amplifier U-614 via terminal 704.

If an aircraft touches ground while banked during a landing, the force on the particular main landing gear wheel touching the ground imparts a banking moment to the aircraft, causing it to tend to level itself, it being assumed that the runway is level. Such a banking moment depends upon the vertical force on the aircraft and the resiliency of the aircraft landing gear. In simulating such a phenomenon, the vertical force potential from amplifier U-701 is applied in opposite sense to the ends of the winding of potentiometer R-705, the arm of which is positioned by the trainer angle of bank servo M-601. The winding of potentiometer R-705 is shorted along the greater portion of each end of its winding, so that the arm of potentiometer R-705 traverses an impedance portion only during small angles (for example, 10 degrees) of positive and negative bank angles. As the vertical force on an aircraft compresses the spring or flexible carriage of one wheel of the main landing gear, the banking moment imparted to the aircraft will be an approximately linear function of bank angle until the landing gear spring becomes fully compressed, at which time the banking moment will become a function of vertical force alone. As the arm of potentiometer R-705 is moved from the midpoint of its resistance section, the potential on its arm increases in simulation of landing gear spring compression. When the arm reaches either shorted portion, the potential on its arm reaches a maximum, which is proportional to vertical force. The banking moment potential is applied to amplifier U-707 via contact 7c of switch S-WW to be routed to the banking moments circuit of Fig. 6 via terminal 702. If the simulated aircraft remains level when landing, no banking moments will be applied, but a vertical force will be applied by the ground to oppose the weight of the aircraft. The vertical force will be a function of main landing gear spring compression until the springs become fully compressed. To simulate such vertical forces, the vetical force potential output from amplifier U-701 is applied to excite potentiometer R-706, the arm of which is positioned by the trainer altitude servo. Assuming that the landing gear compresses throughout a distance of two feet, the portion of potentiometer R-706 representing altitudes between two feet and zero altitude comprises a resistance winding, and all portions of the winding representing altitudes greater than two feet are shorted to ground. As the simulated aircraft decreases altitude, the trainer altitude servo M-302 will drive the arm of potentiometer R-706 downwardly as viewed in Fig. 7, applying an increasing potential as the simulated landing gear compresses. This potential is applied to vertical forces summing amplifier U-205 via terminal 701.

Many modern aircraft are equipped with a nose wheel which may be turned to steer the aircraft while it is taxied on the ground, and which supports the forward end of the aircraft to balance the aircraft while it is parked or is moving at low ground speeds. When the aircraft is pitched forward sufficiently, so that a sufficient portion of aircraft weight rests on the nose wheel, turning of the nose wheel imparts a turning moment to the aircraft. When sufficient weight rests on the nose wheel, the aircraft is constrained to follow the nose wheel, and the rate of turn $r$ is forced to be proportional to nose wheel deflection $\delta_{nw}$. In simulation of this phenomenon, a potential proportional to aircraft velocity $V_x$ derived as shown in Fig. 3 is applied at terminal 305 to excite the winding of potentiometer R-708, the arm of which is positioned by the student by manipulation of the simulated nose wheel control. The $V_x \delta_{nw}$ potential is applied to summing amplifier U-708. Applied in opposite sense to amplifier U-708 via terminal 712 is the rate of turn potential $r$ derived as shown in Fig. 6. The difference between these potentials is applied to the yawing moments amplifier (U-614, Fig. 6) to force the rate of turn computed to correspond with that caused by nose wheel deflection. As shown in Fig. 7, the difference potential is applied via contact "$a$" of relay K-NWD and contact "$7f$" of switch S-WW. As will be explained below, relay K-NWD will be operated whenever the simulated aircraft is pitched forward sufficiently for the nose wheel to engage the ground without skidding.

As the simulated aircraft turns on the ground, a centripetal force proportional to aircraft velocity squared and nose wheel deflection will act laterally on the aircraft. A potential to simulate such lateral force is derived and applied to the lateral forces summing amplifier U-204 of Fig. 2. A potential proportional to aircraft velocity squared derived as shown in Fig. 3 is applied via terminal 709 to excite the winding of potentiometer R-709, the arm of which is positioned by the student by manipulation of the simulated nose wheel turning control. The $V_x^2 \delta_{Nw}$ potential is applied via contact "$b$" of relay K-NWD, contact "$7d$" of switch S-WW and terminal 711 to lateral forces summing amplifier U-204 of Fig. 2. As will be apparent the side force and the turning moment due to nose wheel deflection are effective only when an aircraft is pitched forward sufficiently. Relay K-NWD is energized by a potential which varies with pitch angle of the simulated aircraft, being connected to the arm of potentiometer R-710, said arm being positioned by the trainer pitch angle servo M-602. As shown schematically in Fig. 7, the winding of potentiometer R-710 is shorted at its grounded end, which represents all pitch angles upward, at which the nose wheel does not contact the ground. As the simulated aircraft pitches forward (nose down) servo M-602 drives the arm upwardly as viewed in Fig. 7, the arm being shown in the position corresponding to the wheel just touching the ground. As the aircraft pitches further forward the arm is driven upwardly on the lower resistance portion 713 of the winding of potentiometer R-710, applying an increasing voltage to the arm of the potentiometer and the coil of relay K-NWD. At a point representing a pitch angle at which sufficient weight rests on the simulated nose wheel, the voltage on the arm of potentiometer R-710 is sufficient to operate relay K-NWD, to apply the above-described nose-wheel forces potentials. The potential on the arm of potentiometer R-710 is proportional to the force between the simulated nose wheel and the runway, and hence is proportional to the pitching moment imparted to the aircraft by the vertical force on the nose wheel. This potential is applied to the pitching moments circuit via contact "$7g$" of switch S-WW and amplifier U-703. The potential increases in an approximately linear fashion as the arm is driven upwardly on portion 713 of the winding of potentiometer R-710, simulating the increasing pitching moment as the springs of the nose wheel compress as the simulated aircraft pitches forward. At a pitch angle where further pitching applies more weight to the nose wheel and begins to de-compress the springs of the main landing gear, the arm of potentiometer R-713 begins to traverse portion 714 of the winding, applying a potential which increases at a greater rate to the pitching moments circuit. At a pitch angle where the nose wheel spring is fully compressed, the arm of potentiometer R-710 traverses the upper shorted portion of the winding, applying the maximum nose wheel pitching moment potential to the pitching moments circuit.

As the aircraft turns on the ground, centrifugal force tends to bank the aircraft in the same manner an automobile tends to bank while going around a curve. The banking moment is proportional to centrifugal force $mVr$, where $m$ equals aircraft mass, $V$ equals speed and $r$ equals rate of turn. In simulation of such phenomenon a banking moment potential, $mVr$ is applied at terminal 715. This potential is derived by applying the rate of turn potential $r$ from the output of integrator I-605 (see Fig. 6) via terminal 712 to excite the winding of potentiometer R-320 (see Fig. 3), the arm of which is positioned by the trainer $V_x$ servo M-306. The $rV_x$ potential is routed via terminal 316 to potentiometer R-224 (Fig. 2) to be modified in accordance with simulated aircraft mass, after which it is routed to terminal 715.

The forward speed potential $V_x$ is also applied via terminal 305 and an amplifier to the coil of relay K-FS. A constant potential from the computer power supply is applied via terminal 200, contact "$a$" of relay K-FS and contact "$7h$" of switch S-WW to the input of amplifier U-208. This potential, which represents static friction, is applied whenever the aircraft is at standstill on the ground or runway. As soon as simulated forward speed occurs, relay K-FS opens its contact "$a$," removing the static friction potential.

In summary it may be desirable to compare the operation of my invention under various simulated flight conditions with that of typical prior art apparatus. When an actual aircraft is situated parked on a runway, a strong wind will cause an indication on the aircraft indicated airspeed meter. Since prior art trainers do not simulate wind during ground conditions, no indication will appear on the airspeed meter of such trainers, but in apparatus constructed according to my invention the indication will appear, and will be correctly simulated for differences in aircraft heading relative to the wind. A wind of sufficient strength will move a parked aircraft. The simulation of such movement is realistically provided in my invention, but has been completely neglected in the prior art.

As the engine or engines of a grounded aircraft are "accelerated" or propeller pitch angle is increased to increase the thrust force, the instant at which the aircraft begins to move depends upon the wind velocity and direction. Complete simulation of such operation is provided in my invention and ignored in prior art devices. As a moving aircraft travels down a runway, the point at which it can acquire enough "airspeed" to leave the ground depends upon the wind velocity and direction, as evidenced by the fact that pilots prefer to takeoff "into the wind" in order to leave the runway in as short a distance as possible. The effect of wind velocity and direction on takeoff distance is completely ignored in prior art trainers and is realistically simulated in the instant invention, since the aircraft dynamic pressure (upon which "lift" depends) computation in the instant invention takes into account the effect of "wind" on the dynamic pressure acting on the simulated aircraft. As an aircraft taking off at an angle to the wind leaves the ground, it very often changes heading abruptly as the wheel forces are eliminated allowing aerodynamic forces and moments alone to determine the heading of the aircraft. In prior art trainers no such phenomenon is simulated. In the instant invention aerodynamic forces and ground forces are accurately computed at all times, providing a thoroughly realistic simulation of aircraft operation on takeoff. As mentioned above prior art devices generally eliminate simulated wind potentials during simulated "on ground" conditions, adding wind velocity potentials to aircraft velocity potentials with respect to a still air mass as the simulated aircraft takes off, providing suitable potentials for actuating a recording pen on a map. Inasmuch as wind affects aircraft speed on the ground as well as when airborne, it will be apparent that the prior art system of computing speed on the ground is erroneous. Such error has not been too serious in trainers providing no visual reference to ground for the student since the distance of travel on the ground is small compared to the dimensions of an entire aircraft flight. However in trainers equipped to provide visual representations of runways, airports, other ground scenes or such landing places as carrier decks, the presence of a true ground speed potential is necessary to provide realistic simulation from "on ground" to "in flight" conditions.

As an aircraft travels through rough air, the instrument indications and other visual cues observed by a pilot may vary in erratic fashion. In prior art trainers behavior of the simulated aircraft in rough air has been simulated by the application of random variations to the instruments and cockpit, the random variations generally being functions of a complex cam. In such systems no attempt has been made to determine the actual behavior of the aircraft due to rough air, and purely arbitrary variations have been imparted to the instruments and cockpit. In the instant invention the effects of rough air may be very realistically simulated as mentioned above by random movement of the wind intensity control. Since the variations imparted to the wind intensity control effect the dynamic pressure, sideslip angle and angle of attack computations, thereby affecting the trainer attitude instruments correctly, the trainer instruments behave in the same manner as in an actual aircraft, enabling the student to gain practice in steadying the aircraft during simulated rough air conditions.

As an aircraft descends preparing to land, the speed of the aircraft needed to follow a desired glide path depends upon the wind velocity and direction relative to the runway, and hence the ability of a pilot to land in a particular spot on the runway depends upon wind speed and direction. Several rather complex procedures are commonly utilized for landing in cross winds. One of such procedures is to fly unbanked and to point the aircraft towards the wind so that the aircraft may travel over the runway in a direction parallel to the runway until a very short time before the wheels touch, at which time the aircraft is yawed suddenly to align its longitudinal axis and wheels with the runway. Prior art trainers provide no facilities for practicing such landing procedures since disabling of the wind potentials in such trainers upon touchdown prevents simulating the forced change in heading caused as a sideslipping aircraft touches down, and since actual aircraft speed with respect to the ground is not available as a potential after touchdown in such trainers.

While the novel computing system for simulating wind effects has been illustrated with reference to a fixed wing aircraft, it will be apparent that the system is readily usable in trainers constructed to simulate helicopters, converti-planes and the like. While the sideslip angle, angle of attack and aerodynamic forces and moments in such rotary-winged aircraft might be replaced by somewhat different apparatus than shown in Figs. 5 and 6, the overall flight system shown would apply as well to the simulation of such aircraft as to that of fixed wing aircraft.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. Grounded aircraft training computer apparatus comprising axial acceleration computer means responsive to input potentials commensurate with forces tending to translate a simulated aircraft and operative to produce output potentials commensurate with acceleration of said simulated aircraft, ground speed computing means including integrating means responsive to said output potentials and operable to produce potentials commensurate with simulated aircraft velocities with respect to the ground, means controllable by an instructor for deriving potentials commensurate with velocities of a simulated wind with respect to the ground, vector summing means responsive to said ground speed and wind velocity potentials for providing an airspeed potential commensurate with the relative velocity between said simulated aircraft and said air mass, means for modifying said airspeed potential as a function of simulated altitude to provide a dynamic pressure potential, aerodynamic forces and moments computing means responsive to said dynamic pressure potential for deriving force potentials tending to accelerate said aircraft, and circuit means for applying said force potentials to said axial acceleration computer means.

2. Grounded aircraft training computer apparatus comprising acceleration computer means responsive to thrust, aerodynamic, wind and ground forces potentials for deriving potentials commensurate with accelerations of a simulated aircraft, and ground speed computer means responsive to said acceleration potentials for providing potentials commensurate with velocities of said simulated aircraft with respect to the earth, means for deriving further potentials commensurate with the velocities of a simulated wind with respect to the earth, and means combining said potentials commensurate with velocities of said simulated aircraft with said potentials commensurate with said velocities of said simulated wind to provide simulated airspeed potentials, said acceleration computer means being responsive to said simulated airspeed potentials.

3. Grounded aircraft training computer apparatus comprising means for deriving a potential commensurate with the angular velocity of the longitudinal axis of the flight path of a simulated aircraft, means for deriving a potential commensurate with the angular velocity of the longitudinal axis of said simulated aircraft, means combining and integrating the aforesaid potentials to provide a first sideslip angle potentail commensurate with sideslip angle of said simulated aircraft due to forces and moments relative to a still air mass, means for deriving a second potential commensurate with velocity of a simulated wind normal to the direction of travel of said simulated aircraft, means for deriving a third potential commensurate with velocity of said aircraft relative to still air in a direction parallel to the direction of travel of said simulated aircraft, means responsive to said second and third potentials for deriving a second sideslip angle potential commensurate with sideslip angle of said simulated aircraft due to wind, and means combining said first and second sideslip angle potentials to provide a potential commensurate with the actual sideslip angle of said simulated aircraft.

4. Grounded aircraft training computer apparatus comprising means for deriving potentials commensurate with pitching rate and rate of change of path elevation angle of a simulated aircraft, means combining and integrating said potentials to provide a first angle of attack potential commensurate with angle of attack of said simulated aircraft due to forces and moments relative to a still air mass, means for deriving a second potential commensurate with velocity of a simulated wind normal to the direction of travel of said simulated aircraft, means for deriving a third potential commensurate with velocity of said aircraft in a direction parallel to the direction of travel of said simulated aircraft, means responsive to said second and third potentials for deriving a second angle of attack potential commensurate with angle of attack of said simulated aircraft due to wind, and means combining said first and second angle of attack potentials to provide a potential commensurate with the actual angle of attack of said simulated aircraft.

5. In grounded training computer apparatus comprising a student's station having control simulating those of an actual aircraft and flight computers for solving the equations of motion of a simulated aircraft including forces and moments computing means, acceleration computer means responsive to said forces and moments computing means and to potentials derived by operation of various of said controls for deriving acceleration potentials commensurate with accelerations of said simulated aircraft with respect to the earth and means responsive to said acceleration potentials for deriving velocity potentials, the combination of means for deriving a wind potential commensurate with velocity of a simulated wind, means for vectorially combining said velocity potentials and said wind potential to provide a potential commensurate wtih airspeed of said simulated aircraft.

6. Apparatus as in claim 5 having means for modifying said airspeed potential as a function of simulated altitude to provide a dynamic pressure potential.

7. Apparatus as in claim 5 having means for modifying said airspeed potential as a function of simulated altitude to provide a dynamic pressure potential, and circuit means applying said dynamic pressure potential to said forces and moments computing means.

8. In grounded flight training computer apparatus providing simulation of grounded as well as airborne travel and having computers for deriving potentials commensurate with yawing moments and rate of turn of a simulated aircraft, the combination of a simulated turning control, means for deriving a potential commensurate with forward speed of said simulated aircraft, potentiometer means connected to said turning control for modifying said speed potential to provide a second potential, means combining said second potential and said rate of turn potentials in opposite sense to provide a third potential commensurate with the difference between said combined potentials, and circuit means applying said third potential to said yawing moments computer to force said third potential to zero, whereby said rate of turn potential is forced to be commensurate with displacement of said simulated turning control.

9. Apparatus in claim 8 in which said circuit means comprises switching means responsive to altitude of said simulated aircraft and operative to apply said third potential at simulated flight conditions below a minimum altitude.

10. Apparatus according to claim 8 in which said circuit means comprises switching means responsive to altitude and pitch angle of said simulated aircraft and said turning control comprises a simulated nose wheel control.

11. Grounded aircraft training computer apparatus comprising in combination means for deriving a first potential commensurate with simulated vertical force acting on a simulated aircraft, bank angle computer means for modifying said potential in accordance with simulated bank angle of said simulated aircraft, said bank angle computer means including summing means for combining potentials commensurate with simulated rolling moments acting on said simulated aircraft and a simulated bank angle servo operable to provide a shaft position commensurate with simulated bank angle, a potentiometer having a winding excited in accordance with said first potential and a wiper arm positioned by said servo, said winding comprising a resistance connected between two conductors excited respectively with opposite polarity potentials commensurate in magnitude with said first potential, and altitude-responsive circuit means operable upon occurrence of a minimum simulated altitude to apply the potential on said wiper arm to said summing means.

12. Grounded aircraft training computer apparatus comprising in combination means for deriving a first potential commensurate with simulated vertical force acting on a simulated aircraft, altitude computer means operable to modify said first potential in accordance with simulated altitude of said simulated aircraft, said altitude computer means including summing means for combining potentials commensurate with simulated vertical forces acting on said simulated aircraft and a simulated altitude servo operable to provide a shaft position commensurate with simulated altitude, a potentiometer excited by said first potential and positioned by said servo to provide an output potential commensurate with the force tending to compress the landing gear of said simulated aircraft, and altitude-responsive circuit means operable upon occurrence of a minimum simulated altitude to apply said output potential to said summing means.

13. Grounded aircraft training computer apparatus comprising in combination computer means for combining potentials commensurate with lateral acceleration of a simulated aircraft, means for deriving a first potential commensurate with the square of the simulated longitudinal velocity of said simulated aircraft, a simulated steering control, means operable by said steering control for modifying said first potential to provide a second potential commensurate with simulated centripetal force, and altitude-responsive circuit means operable upon occurrence of a minimum simulated altitude to apply said second potential to said computer means.

14. Grounded aircraft training computer apparatus comprising in combination means for deriving a first potential commensurate with simulated vertical forces acting on a simulated aircraft, left and right simulated braking controls, means operated by said simulated braking controls for modifying said first potential to provide left and right braking force potentials, a potential combining circuit, first switching means connecting said left braking force potential to said potential combining circuit, second switching means connecting said right braking force potential to said potential combining circuit, means responsive to simulated bank angle of said simulated aircraft connected to operate said first and second switching means, said first switching means being operable upon simulated left banking of said simulated aircraft to disconnect said right braking force potential and to increase said left braking force potential, and said second switching means being operable upon simulated right banking of said simulated aircraft to disconnect said left braking force potential and to increase said right braking force potential.

15. Apparatus according to claim 14 having computer means for combining potentials commensurate with simulated longitudinal forces acting on said simulated aircraft, said potential combining circuit comprising means for providing an output potential commensurate with the sum of the potentials applied to said combining circuit by said first and second switching means, and altitude-response third switching means operable upon occurrence of a selected minimum simulated altitude to apply said output potential to said computer means.

16. Apparatus according to claim 14 having computer means for combining potentials commensurate with simulated yaw moments of said simulated aircraft, said potential combining circuit comprising means for providing an output potential commensurate with the difference between the potentials applied to said combining circuit by said first and second switching means, and altitude-responsive third switching means operable upon occurrence of a selected minimum simulated altitude to apply said output potential to said computer means.

17. Grounded training computer apparatus comprising in combination computer means for combining potentials commensurate with simulated accelerations of a simulated aircraft along a path with respect to ground, integrating means responsive to said computer means to provide a first potential commensurate with simulated longitudinal velocity along said path with respect to ground, means for deriving a second potential commensurate with simulated wind velocity, means for modifying said second potential in accordance with the simulated angle between said simulated path and the simulated direction of said simulated wind velocity, means for further modifying said second potential in accordance with simulated flight path elevation angle to provide a third potential commensurate with velocity of the simulated wind along said path, and means for combining said first potential and said third potential to provide an output potential commensurate with simulated airspeed along said simulated path.

18. Grounded aircraft training computer apparatus comprising in combination computer means for combining potentials commensurate with simulated forces and moments tending to accelerate a simulated aircraft, means responsive to said computer means for deriving first potentials commensurate with velocities of said simulated aircraft with respect to a set of reference axes, means for deriving second potentials commensurate with velocities of a simulated wind with respect to said axes, means combining said first and second potentials to provide simulated airspeed potentials, means for modifying said airspeed potentials in accordance with simulated altitude to provide a simulated dynamic pressure potential, means responsive to said simulated dynamic pressure potential to derive said potentials commensurate with simulated forces and moments, means for modifying said airspeed potential in accordance with simulated altitude to derive a simulated Mach number potential, and means responsive to said Mach number potential for modifying said forces and moments potentials.

19. Grounded aircraft training computer apparatus, comprising in combination, computer means for combining potentials commensurate with simulated pitching moments of a simulated aircraft, potentiometer means for deriving a first potential commensurate with simulated pitch angle of said simulated aircraft, said potentiometer means comprising a first portion operable at simulated pitch angles upward from a reference simulated pitch angle to derive a potential commensurate with the absence of a pitching moment, a second portion operable throughout a first range of simulated downward pitch angles from said reference simulated pitch angle to derive increasing simulated pitching moment potentials at increasingly downward simulated pitch angles, and a third portion operable throughout a second range of simulated downward pitch angles to derive a constant simulated pitching moment potential, and circuit means operable upon occurrence of a minimum simulated altitude to apply said first potential to said pitching computer means.

20. In grounded aircraft training computer apparatus for providing simulation of ground and airborne travel, means for providing a potential commensurate with a retarding force tending to decelerate a simulated aircraft, said means comprising in combination, means for deriving a first potential commensurate with vertical force acting on said simulated aircraft, means for modifying said first potential in accordance with operation of simulated braking control means to derive a braking force potential, simulated altitude-responsive circuit means for applying said braking force potential at a selected simulated altitude, means for deriving a simulated skidding potential commensurate with said first potential, and means for comparing said first potential and said braking force potential and for disconnecting said braking force potential from, and connecting said skidding potential to, said circuit means upon occurrence of a predetermined relationship between said first potential and said braking force potential.

21. Grounded aircraft training computer apparatus comprising in combination, means for providing a first potential commensurate with vertical forces acting on a simulated aircraft, simulated left and right braking control means, means operable by said braking control means for modifying said first potential to derive simulated left and right braking force potentials, means for deriving left and right skidding potentials commensurate in magnitude with said first potential, a pair of comparator means each responsive to one of said braking force potentials and to said first potential and operable to actuate a switching means upon occurrence of a predetermined relationship between the braking force potential and said first potential, each switching means being operable upon actuation to disconnect a respective braking force potential and to apply a skidding force potential.

22. Apparatus according to claim 21 having computer means for combining potentials commensurate with longitudinal forces of said simulated aircraft, summing means responsive to said switching means to combine the potentials applied by said switching means, and altitude-responsive second switching means operable upon occurrence of a selected minimum simulated altitude to apply the output potential from said summing means to said computer means.

23. Apparatus according to claim 21 having computer means for combining potentials commensurate with yaw moments of said simulated aircraft, summing means responsive to said switching means to provide an output potential commensurate with the difference between the potentials applied by said switching means, and altitude-responsive second switching means operable upon occurrence of a selected minimum simulated altitude to apply said output potential from said summing means to said computer means.

24. Grounded aircraft training computer apparatus comprising computer means for deriving first potentials commensurate with velocities of a simulated aircraft with respect to a set of simulated stationary ground reference axes assumed to be fixed with respect to the earth, means controllable by an instructor for deriving second potentials commensurate with components of simulated wind velocity with respect to said axes, means for vectorially combining said first and second potentials to provide a resultant potential commensurate with velocity of said simulated aircraft with respect to its surrounding air mass, and means including an aerodynamic accelerations computer responsive to said resultant potential for modifying the potentials derived by said computer means, said computer means including integrating means responsive to said accelerations computer and operable to provide said first potentials.

25. Grounded aircraft training computer apparatus comprising means for deriving a first set of potentials commensurate with velocities of a simulated aircraft with respect to a pair of mutually perpendicular stationary reference axes assumed to be fixed with respect to the earth, means for deriving a second set of potentials commensurate with velocities of a simulated moving air mass with respect to said axes, means for vectorially combining said first and second sets of potentials to provide a further computer quantity commensurate with the relative velocity between said simulated aircraft and said air mass, means responsive to the said further computer quantity for providing a potential commensurate with simulated airspeed, and a ground track recorder connected to be operated by said first set of potentials, said means for deriving said first set of potentials including aerodynamic forces and moments computer means controlled by said further computer quantity.

26. Grounded aircraft training computer apparatus comprising means for deriving a first set of potentials commensurate with velocities of a simulated aircraft with respect to a trio of mutually perpendicular stationary reference axes, means for deriving a second set of potentials commensurate with velocities of a simulated moving air mass with respect to a horizontal pair of said axes, means for combining said potentials commensurate with velocities along respective axes to provide further potentials commensurate with the relative velocities along said axes between said simulated aircraft and said air mass, means responsive to the resultant of said further potentials for providing a potential commensurate with simulated airspeed, dynamic pressure computer means responsive to a function of said airspeed potential for providing potentials commensurate with dynamic pressure of simulated flight, ground track indicating means connected to be operated in accordance with said first set of potentials, said means for deriving said first set of potentials including aerodynamic forces and moments computer means connected to be controlled by said potentials commensurate with dynamic pressure.

27. Grounded aircraft training computer apparatus comprising first means for deriving a potential commensurate with the angular velocity of the longitudinal axis of the flight path of a simulated aircraft, second means for deriving a potential commensurate with the angular velocity of the longitudinal axis of said simulated aircraft, means combining and integrating the aforesaid potentials to provide a first sideslip angle potential commensurate with sideslip angle of said simulated aircraft due to forces and moments relative to a still air mass, computer means for deriving a second potential commensurate with simulated sideslip angle of said aircraft solely due to simulated wind, means combining said potentials to provide an output potential commensurate with actual sideslip angle of said simulated aircraft, and means responsive to said output potential for providing a plurality of aerodynamic force and moment potentials commensurate with simulated effects due to sideslipping, said plurality of force and moment potentials being connected to control the outputs of said first and second means.

28. Grounded aircraft training computer apparatus comprising first computer means for deriving a first potential commensurate with the angle of attack of a simulated aircraft due to simulated motion of said simulated aircraft relative to surrounding air in the absence of any simulated wind, second computer means for deriving a second potential commensurate with angle of attack of said aircraft solely due to simulated wind, means combining said potentials to provide an output potential commensurate with actual angle of attack of said simulated aircraft, and means responsive to said output potential for providing a further potential commensurate with simulated lift, said further potential being connected to control the outputs of said first computer means.

29. In grounded aircraft training computer apparatus for providing simulation of ground and airborne travel, computer means for deriving potentials commensurate with simulated ground speed and rate of turn of a simulated aircraft, means for multiplying said potentials to derive a banking moment potential commensurate with banking due to centrifugal force while turning on the ground, a banking moments computer means responsive to a plurality of further potentials commensurate with forces and moments tending to bank said simulated aircraft, means for providing a simulated altitude quantity commensurate with simulated absolute altitude of said simulated aircraft above ground altitude, and circuit means responsive to simulated ground altitude of said simulated aircraft for applying said banking moment potential to said banking moments computer means.

30. In grounded aircraft training computer apparatus for providing simulation of ground and airborne travel, means for deriving a first potential commensurate with vertical force acting on a simulated aircraft, bank angle computer means for modifying said potential in accordance with bank angle of the simulated aircraft, said bank angle computer means including means for summing a plurality of further potentials commensurate with aerodynamic moments tending to bank said simulated aircraft and an integrator means for providing a bank angle quantity, means for providing a simulated altitude quantity commensurate with simulated absolute altitude of said simulated aircraft above ground altitude, switching means responsive to simulated ground altitude of simulated flight operable to apply said modified potential to said summing means of said bank angle computer means upon occurrence of ground altitude in such sense so as to force said bank angle computer toward a condition commensurate with zero bank angle, said plurality of further potentials being connected to said summing means independently of said switching means.

31. Grounded aircraft training computer apparatus comprising velocity computer means for deriving first potentials commensurate with simulated velocities of a simulated aircraft with respect to a set of reference axes, means for deriving second potentials commensurate with velocity of a simulated wind with respect to said axes, means for combining said first and second potentials to provide a resultant airspeed potential, circuit means coupling said resultant airspeed potential back to said velocity computer means to modify the outputs of said velocity computer means, said velocity computer means comprising means for summing and integrating a plurality of potentials commensurate with simulated forces with respect to time to provide said first potentials, and recorder means operated by said velocity computer means for plotting the ground track of said simulated aircraft in accordance with said first potentials.

32. Apparatus according to claim 31 having dynamic pressure computer means responsive to said resultant airspeed potential and responsive to simulated altitude of said simulated aircraft for deriving a potential commensurate with dynamic pressure of simulated flight, said circuit means including said dynamic pressure computer means, said dynamic pressure computer means being connected to modify certain of said simulated forces potentials in accordance with simulated dynamic pressure.

33. In grounded aircraft training computer apparatus having velocity computer means for deriving ground speed potentials commensurate with velocity of a simulated aircraft with respect to a set of stationary axes and means for deriving potentials commensurate with velocity of a simulated wind with respect to said axes comprising squaring means for deriving a first potential commensurate with the square of said simulated aircraft velocity, means for deriving a second potential commensurate with the square of said simulated wind velocity, means for deriving a third potential commensurate with the product of said aircraft velocity, said wind velocity and the angle between said aircraft and wind velocities, summing means combining said first, second and third potentials, and servo means responsive to the output of said summing means, said servo means being provided with squaring rebalancing means, whereby the position of said servo will be commensurate with simulated airspeed of said simulated aircraft, means operated by said servo means for deriving a simulated dynamic pressure quantity, accelerations computer means responsive to said simulated dynamic pressure quantity for providing a plurality of further potentials commensurate with simulated forces and moments, said velocity computer means being responsive to said plurality of further potentials and operable to integrate said further potentials with respect to time to provide said ground speed potentials, and a ground track recorder connected to be operated by said ground speed potentials.

34. Grounded aircraft training computer apparatus comprising in combination, pitching computer means for combining a plurality of potentials commensurate with simulated pitching moments of a simulated aircraft and for providing a shaft position output quantity commensurate with simulated pitch angle of said simulated aircraft, potentiometer means positioned by said shaft position output quantity for deriving a first potential commensurate with simulated pitch angle of said simulated aircraft, an altitude servomechanism means operable to provide an output quantity commensurate with simulated absolute altitude of said simulated aircraft above ground altitude, and circuit means including switching means controlled by said altitude servomechanism means operable upon occurrence of a simulated ground altitude to apply said first potential to said pitching computer means.

35. In grounded aircraft training computer apparatus for providing simulation of ground and airborne travel, means for providing a potential commensurate with a retarding force tending to decelerate a simulated aircraft, said means comprising in combination, means for deriving a first potential commensurate with vertical force acting on said simulated aircraft, potentiometer means for modifying said first potential in accordance with operation of simulated braking control means to derive a braking force potential, means for deriving a plurality of further potentials commensurate with thrust, drag and further acceleration forces acting longitudinally on said simulated aircraft, an acceleration forces summing circuit responsive to said braking force potential and said plurality of further potentials and operative to provide a simulated resultant acceleration potential, means for integrating said resultant acceleration potential with respect to time to provide a simulated ground speed potential, an altitude servomechanism means operable to provide an altitude output quantity indicative of simulated absolute altitude of said simulated aircraft at or above ground altitude, and simulated altitude-responsive circuit means for applying said braking force potential to said acceleration forces summing circuit at simulated ground altitude, said altitude-responsive circuit means comprising switching means connected to be operated by said altitude output quantity to disconnect said braking force potential from said acceleration forces summing circuit at simulated altitude above simulated ground altitude.

36. Apparatus according to claim 35 having further switching means connected to disable said braking force potential, bank angle computer means responsive to a plurality of potentials commensurate with simulated banking moments and operative to provide a simulated bank angle output quantity, said switching means being connected to be controlled by said bank angle output quantity to disconnect said braking force potential from said acceleration forces summing circuit whenever said simulated bank angle increases appreciably in either direction from zero simulated bank angle.

37. Grounded aircraft training computer apparatus comprising in combination, means for providing a first potential commensurate with vertical forces acting on a simulated aircraft, simulated left and right braking control means, potentiometer means operable by said braking control means for modifying said first potential to derive simulated left and right braking force potentials, means for deriving a plurality of further potentials commensurate with thrust, drag and further acceleration, forces acting longitudinally on said simulated aircraft, an acceleration forces summing circuit responsive to said braking force potentials and said further potentials and operative to provide a simulated resultant acceleration potential, means for integrating said resultant acceleration potential with respect to time to provide a simulated ground speed potential, an altitude servomechanism means operable to provide a simulated absolute altitude quantity, first switching means controlled by said simulated absolute altitude quantity and operative to disconnect both of said braking force potentials from said acceleration forces summing circuit when said simulated altitude quantity increases above a simulated ground altitude condition, a bank angle computer means operable to provide a bank angle output quantity varying in sense in accordance with simulated bank angle of said simulated aircraft, and further switching means controlled by said bank angle output quantity and operable to disconnect said left and right braking potentials selectively from said summing circuit as simulated bank angle of said simulated aircraft varies in sense.

38. Grounded aircraft training computer apparatus, comprising in combination, means responsive to simulated weight and lift factors for providing a first potential commensurate with resultant vertical forces acting on a simulated aircraft, simulated left and right braking control means operable by a trainee, potentiometer means connected to be excited by said first potential and positioned by operation of said control means to derive simulated left and right braking force potentials of opposite sense, means for deriving a plurality of further potentials commensurate with simulated yaw moments acting on said simulated aircraft, a yaw moments summing circuit responsive to said braking force potentials and said further potentials and operative to provide a resultant yawing acceleration potential, an altitude servomechanism means operable to provide a simulated absolute altitude quantity, a bank angle computer means operable to provide a bank angle output quantity varying in sense in accordance with simulated bank angle of said simulated aircraft, first switching means controlled by said absolute altitude quantity and operative to disconnect both of said braking potentials simultaneously from said summing circuit when said simulated altitude quantity increases above a simulated ground altitude condition, and second switching means controlled by said bank angle output quantity and operable to selectively disconnect one or the other of said braking force potentials from said summing circuit depending upon the sense of said bank angle output quantity when a simulated ground altitude condition exists.

References Cited in the file of this patent

UNITED STATES PATENTS

| | | |
|---|---|---|
| 2,475,314 | Dehmel | July 5, 1949 |
| 2,529,468 | Dehmel | Nov. 7, 1950 |
| 2,553,529 | Dehmel | May 15, 1951 |
| 2,627,675 | Kittredge | Feb. 10, 1953 |
| 2,636,285 | Fogarty et al. | Apr. 28, 1953 |
| 2,687,580 | Dehmel | Aug. 31, 1954 |
| 2,731,737 | Stern | Jan. 24, 1956 |
| 2,784,501 | Stern et al. | Mar. 12, 1957 |

OTHER REFERENCES

The University of Conn. Engineering Experiment Station (Robb et al.), pp. 4–7, 1953.

Wood, Jr.: The Modern Flight Simulator, Electrical Engineering (December 1952, pages 1124 to 1129).

Machmeter, Aviation, September 1944, page 128, Link for the Jets, Aero Digest, February 1950, pages 36, 37, 99, 100.

Electronic Instruments (Greenwood et al.), pages 131–135, 1948.